(12) United States Patent
Noda

(10) Patent No.: US 6,657,218 B2
(45) Date of Patent: Dec. 2, 2003

(54) METHOD AND APPARATUS FOR MEASURING GAP, METHOD AND APPARATUS FOR MEASURING SHAPE AND METHOD FOR MANUFACTURING LIQUID CRYSTAL DEVICE

(75) Inventor: Masaaki Noda, Hara-mura (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/001,239

(22) Filed: Oct. 31, 2001

(65) Prior Publication Data

US 2002/0088928 A1 Jul. 11, 2002

(30) Foreign Application Priority Data

Nov. 1, 2000 (JP) .......................................... 2000-334107
Oct. 22, 2001 (JP) .......................................... 2001-323732

(51) Int. Cl.[7] .............................................. G01N 21/00
(52) U.S. Cl. .......................... 250/559.26; 250/559.39; 356/505
(58) Field of Search ........................ 250/559.26, 559.39, 250/559.27, 559.22; 349/192; 356/505, 498, 503, 504

(56) References Cited

U.S. PATENT DOCUMENTS

| | | | | |
|---|---|---|---|---|
| 5,225,690 A | * | 7/1993 | Sakai et al. | 250/559.09 |
| 6,064,462 A | * | 5/2000 | Takeuchi et al. | 349/192 |
| 6,081,337 A | * | 6/2000 | Kwok et al. | 356/601 |

* cited by examiner

*Primary Examiner*—David V. Bruce
*Assistant Examiner*—Hoon Song
(74) *Attorney, Agent, or Firm*—Harness, Dickey & Pierce, P.L.C.

(57) ABSTRACT

A gap measuring method characterized by comprising the steps of: applying a plurality of color lights to a member provided with a gap, to produce color interference fringes; obtaining respective intensities of the color lights in the images of the interference fringes taken by a color camera, at each of predetermined positions of each image, so as to compute and actual ratio among the obtained intensities of the color lights for each of the predetermined positions; and obtaining gap values of a plurality of points of the gap provided in the member, based on said actual ratio and theoretical ratios each of which is computed based on intensities of said color lights in an image corresponding to each of preliminarily set gap values.

32 Claims, 18 Drawing Sheets

METHOD AND APPARATUS FOR MEASURING GAP, METHOD AND APPARATUS FOR MEASURING SHAPE AND METHOD FOR MANUFACTURING LIQUID CRYSTAL DEVICE

CROSS REFERENCE TO RELATED APPLICATIONS

The present application claims priority under 35 U.S.C. §119 to Japanese Patent Application No. 2001-323732, filed on Oct. 22, 2001, entitled "METHOD AND APPARATUS FOR MEASURING GAP, METHOD AND APPARATUS FOR MEASURING SHAPE AND METHOD FOR MANUFACTURING LIQUID CRYSTAL DEVICE". The contents of that application are incorporated herein by reference in their entirely.

BACKGROUND OF THE INVENTION

1. Technical Field to Which the Invention Belongs

The present invention relates to technology for measuring a clearance (gap) between members or a shape thereof by utilizing interference of light.

2. Description of the Related Art

Conventionally, as an apparatus for measuring a gap in a light transmission member such as a liquid crystal cell, for example, there has been employed such a gap measuring apparatus as shown in a configuration diagram in FIG. 19. This gap measuring apparatus utilizes a phenomenon that refractive waves from a top face and a bottom face of a gap in actual thickness "d" (refraction index of a medium is defined as "n") illuminated by an objective lens of a microscope via a half mirror return with a second phase difference, and these two lights pass through a Wollaston prism and polarizing plates A and P, thereby producing an interference fringe. That is, a peak gap "y" between an interference fringe caused by the refractive lights of the top face and bottom face and an interference fringe in cross line on the refractive wave face between the top face and bottom face is measured, whereby a value of the gap "d" is obtained by the following formula (1):

$$y = nd/(n_e - n_o)\tan\theta \qquad (1)$$

where θ denotes a Wollaston prism angle, and $n_e$ and $n_o$ each denote a refractive index of the Wollaston prism angle.

However, the above described conventional gap measuring instrument is intended for measuring one point of an object. In order to measure a gap distribution in a predetermined section, measurement must be repeated while such an object is being moved, which is complicated in work and requires much time.

SUMMARY OF THE INVENTION

The present invention in accomplished taking the foregoing problem into consideration. Accordingly, an object of the invention is to provide a method and apparatus capable of measuring a gap between objects or a shape of such an object with a high speed and high precision and a method for effectively manufacturing a liquid crystal device.

To achieve the foregoing object, the present invention adopts the following structures.

(1) A gap measuring method characterized by comprising the steps of:

applying a plurality of color lights to a member provided with a gap, to produce color interference fringes;

obtaining respective intensities of the color lights in the images of the interference fringes taken by a color camera, at each of predetermined positions of each image, so as to compute an actual ratio among (or of) the obtained intensities of the color lights for each of the predetermined positions; and obtaining gap values of a plurality of points of the gap provided in the member, based on said actual ratio and theoretical ratios each of which is computed based on intensities of said color lights in an image, correspondingly to each of preliminarily set gap values.

(2) A gap measuring method in (1), characterized in that the interference fringe is obtained by using transmitted light through the member.

(3) A gap measuring method in (1), characterized in that the interference fringe is obtained by using reflected light from the member.

(4) A gap measuring method in any one of (2)~(3), characterized in that a composite light including said plurality of color lights is applied to the member.

(5) A gap measuring method in any one of (2)~(3), characterized in that white light including said plurality of color lights is applied to the member, and that a filter is provided for transmitting the plurality of color light to the color camera.

(6) A gap measuring method in any one of (1)~(5), characterized in that the intensities of the each color light in the images taken up by the color camera are corrected in consideration of a variable element for the each color light.

(7) A gap measuring method in any one of (1)~(6), characterized in that each of the images is composed of a plurality of pixels, and gap measurement is carried out for each pixel.

(8) A shape measuring method utilizing the gap measuring method in (1)~(7), characterized in that one of members defining a gap is made into a plate-shaped element with a flat surface to effect the measurement, and the shape of the other member defining the gap is determined on the basis of the thus obtained gap measurement value.

(9) A gap measuring apparatus characterized by comprising:

a light source for applying a plurality of different color lights to an object to be measured having light transmission properties;

a color camera for picking up images of interference fringes formed by the light transmitted through the object to be measured;

an image memory for storing images picked up by the color camera;

computing means for obtaining respective intensities of the color lights in the images at each of predetermined positions of each image, so as to compute an actual ratio among (or of) the obtained intensities of the color lights for each of the predetermined positions;

a reference data memory for storing theoretical ratios among (or of) intensities of said color lights in an image, correspondingly to each of preliminarily set gap values; and gap value comparing/determining means for determining gap values of a plurality of points of a gap provided in the object to be measured according to the actual ratio and the theoretical ratios.

(10) A gap measuring apparatus characterized by comprising:

a light source for applying light to an object to be measured having light transmission properties;

a color camera for picking up images of interference fringes formed by the light transmitted through the object to be measured;

a filter for transmitting a plurality of different color lights to the color camera;

an image memory for storing images picked up by the color camera;

computing means for obtaining respective intensities of the color lights in the images at each of predetermined positions of each image to compute an actual ratio among (or of) the obtained intensities of the color lights for each of the predetermined positions;

a reference data memory for storing theoretical ratios among (or of) intensities of said color lights in an image correspondingly to each of preliminarily set gap values; and gap value comparing/determining means for determining gap values of a plurality of points of a gap provided in the object to be measured according to the actual ratio and the theoretical ratios.

(11) A gap measuring apparatus characterized by comprising:

a light source for emitting a plurality of different color lights;

a color camera for picking up images of light interference fringes;

optical means for directing the lights from the light source toward an object to be measured and directing reflected lights thereof from the object to be measured toward the color camera;

an image memory for storing images of the interference fringe formed by the lights from the optical means and picked up by the color camera;

computing means for obtaining respective intensities of the color lights in the images at each of predetermined positions of each image, so as to compute an actual ratio among (or of) the obtained intensities of the color lights for each of the predetermined positions;

a reference data memory for storing theoretical ratios among (or of) intensities of said color lights in an image, correspondingly to each of preliminarily set gap values; and gap value comparing/determining means for determining gap values of a plurality of points of a gap provided in the object to be measured according to the actual ratio and the theoretical ratios.

(12) A gap measuring apparatus characterized by comprising:

a light source for emitting light;

a color camera for picking up images of light interference fringes;

a filter for transmitting a plurality of different color lights to the color camera;

optical means for directing the light from the light source toward an object to be measured and directing reflected light thereof from the object to be measured toward the color camera;

an image memory for storing images of the interference fringe formed by the light from the optical means and picked up by the color camera;

computing means for obtaining respective intensities of the color lights in the image at each of predetermined positions of each image, so as to compute an actual ratio among (or of) the obtained intensities of the color lights for each of the predetermined positions;

a reference data memory for storing theoretical ratios among (or of) intensities of said color lights in an image correspondingly to each of preliminarily set gap values; and gap value comparing/determining means for determining gap values of a plurality of points of gap provided in the object to be measured according to the actual ratio and the theoretical ratios.

(13) A gap measuring apparatus in any one of (9)–(12), characterized by further comprising correction means for correcting the intensities of the each color light of the images picked up by the color camera in consideration of a variable element for the each color light.

(14) A shape measuring apparatus characterized by comprising:

a light source for applying a plurality of different color lights to a measurement object having light transmission properties;

a light transmission plate shaped element with a flat surface disposed apart by a gap the object to be measured;

a color camera for picking up images of interference fringes formed by the lights transmitted through the object to be measured and the light transmission plate shaped element;

an image memory or storing images picked up by the color camera;

computing means for obtaining respective intensities of the color lights in the images at each of predetermined positions of each image, so as to compute an actual ratio among (or of) the obtained intensities of the color lights for each of the predetermined positions;

a reference data memory for storing theoretical ratios among (or of) intensities of said color lights in an image correspondingly to each of preliminarily set gap values;

gap value comparing/determining means for determining gap values of a plurality of points of a gap provided in the object to be measured according to the actual ratio and the theoretical ratios; and gap value/shape converting means for determining a shape of the object to be measured on the basis of the gap values obtained by the gap value comparing/determining means.

(15) A shape measuring apparatus characterized by comprising:

a light source for applying light to an object to be measured having light transmission properties;

a light transmission plate-shaped element with a flat surface disposed apart by a gap from the object to be measured;

a color camera for picking up images of interference fringes formed by the lights transmitted through the measurement object and the light transmission plate shaped element;

a filter for transmitting a plurality of different color lights to the color camera;

an image memory for storing images picked up by the color camera;

computing means for obtaining respective intensities of the color lights in the images at each of predetermined positions of each images so as to compute an actual ratio among (or of) the obtained intensities of the each color lights for each of the predetermined positions;

a reference data memory for storing theoretical ratios among (or of) intensities of said color lights in an image correspondingly to each of preliminarily set gap values;

gap value comparing/determining means for determining gap values of a plurality of points of a gap provided in the object to be measured according to the actual ratio and the theoretical ratios; and gap value/shape converting means for determining a shape of the object to be measured on the basis of the gap values obtained by the gap value comparing/determining means.

(16) A shape measuring apparatus characterized by comprising:

a light source for emitting a plurality of different color lights;

a light transmission plate shaped element with a flat surface disposed apart by a gap from an object to be measured;

a color camera for picking up images of light interference fringes;

optical means for directing the light from the light source toward the object to be measured and the light transmission plate shaped element and directing reflected lights thereof from the object to be measured and the light transmission plate shaped element toward the color camera;

an image memory for storing images of the interference fringe formed by the lights from the optical means and picked up by the color camera;

computing means for obtaining respective intensities of the color lights in the images at each of predetermined positions of each image, so as to compute an actual ratio among (or of) the obtained intensities of the each color lights for each of the predetermined positions;

a reference data memory for storing theoretical ratios among (or of) the intensities of said color lights in an image correspondingly to each of preliminarily set gap values;

gap value comparing/determining means for determining gap values of a plurality of points of a gap provided in the object to be measured according to the actual ratio and the theoretical ratios; and gap value/shape converting means for determining a shape of the object to be measured on the basis of the gap values obtained by the gap value comparing/determining means.

(17) A shape measuring apparatus characterized by comprising:

a light source for emitting light;

a light transmission plate-shaped element with a flat surface disposed apart by a gap from an object to be measured;

a color camera for picking up images interference fringes of light;

a filter for transmitting a plurality of different color lights to the color camera;

optical means for directing the light from the light source toward the object to be measured and the light transmission plate-shaped element and directing reflected lights thereof from the object to be measured and the light transmission plate-shaped element toward the color camera;

an image memory for storing images of the interference fringes formed by the lights from the optical means and picked up by the color camera;

computing means for obtaining respective intensities of the color lights in the images at each of predetermined positions of each image, so as to compute an actual ratio among (or of) the obtained intensities of the color light;

a reference data memory for storing theoretical ratios among (or of) the intensities of said color lights in an image correspondingly to each of preliminarily set gap values;

gap value comparing/determining means for determining gap values of a plurality of points of a gap provided in the object to be measured according to the actual ratio and the theoretical ratios; and gap value/shape converting means for determining a shape of the object to be measured on the basis of the gap values obtained by the gap value comparing/determining means.

(18) A shape measuring apparatus characterized by comprising:

a light source for emitting a composite light of a plurality of different color lights;

a color camera for picking up images of light interference fringes;

a reference reflective member for reflecting light;

optical means for directing the light from the light source as an object light toward an object to be measured so as to direct reflected light thereof from the object to be measured toward the color camera, and for directing the light from the light source as a reference light toward the reference reflective member so as to direct reflected light thereof from the reference reflective member toward the color camera;

an image memory for storing images of the interference fringes formed by the lights from the optical means and picked up by the color camera;

computing means for obtaining respective intensities of the color lights of the images at each of predetermined positions of each image, so as to compute an actual ratio among (or of) the obtained intensities of the color light;

a reference data memory for storing theoretical ratios among (or of) the intensities of said color lights in an image correspondingly to each of preset optical path differences;

optical path difference comparing/determining means for determining differences at a plurality of points between an optical path between the optical means and the object to be measured and an optical path between the optical means and the reference reflective member according to the actual ratio and the theoretical ratios; and an optical path difference/shape converting means for determining a shape of the object to be measured on the basis of the optical path differences obtained by the optical path difference comparing/determining means.

(19) A shape measuring apparatus characterized by comprising:

a light source for emitting light;

a color camera for picking up images of light interference fringes;

a filter for transmitting a plurality of different color lights to the color camera;

a reference reflective member for reflecting light;

optical means for directing the light from the light source as an object light toward an object to be measured so as to direct and directing the light from the light source as a reference light so as to direct reflected light thereof from the reference reflective member toward the color camera;

an image memory for storing images of the interference fringe formed by the lights from the optical means and picked up by the color camera;

computing means for obtaining respective intensities of the color lights of the images at each of predetermined positions of each image, so as to compute an actual ratio among (or of) the obtained intensity of the color lights;

a reference data memory for storing theoretical ratios among (or of) the intensities of said color lights in an image correspondingly to each of preset optical path differences;

optical path difference comparing/determining means for determining differences at a plurality of points between an optical path between the optical means and the object to be measured and an optical path between the optical means and the reference reflective member according to the actually measured ratio and the theoretical ratio; and an optical path difference/shape converting means for determining a shape of the object to be measured on the basis of the optical path differences obtained by the optical path difference comparing/determining means.

(20) A shape measuring apparatus in any one of (14)~(19), characterized by further comprising correction means for correcting the intensities of the color lights of the images picked up by the color camera in consideration of a variable element for the each color light.

(21) A method for manufacturing a liquid crystal device in which liquid crystal is injected and sealed in a gap between two substrates, wherein, utilizing the gap measuring apparatus according to any one of (9)~(13), a gap value of the gap is measured, so that liquid crystal is injected into the gap when the gap value is in a predetermined range.

BRIEF DESCRIPTION OF THE DRAWINGS

DESCRIPTION OF PREFERRED EMBODIMENTS (1) Configuration of an Optical System for Obtaining Color Image Data of an Interference Fringe Used for Gap Measurement First Embodiment FIG. 1 is a configuration diagram showing a first optical system for obtaining a color image of an interference fringe according to one embodiment of the present invention. Lights from a light source 1 that emits color lights with a plurality of different wavelengths (which are three kinds of color lights of as blue, green, and red lights in the following examples.) are emitted to an object to be measured 100 via a back light 2, thereby transmitting the object to be measured 100, and the interference fringe caused by a gap 101 that the object to be measured 100 has is shot a color camera 3.

Second Embodiment

Figure 1:
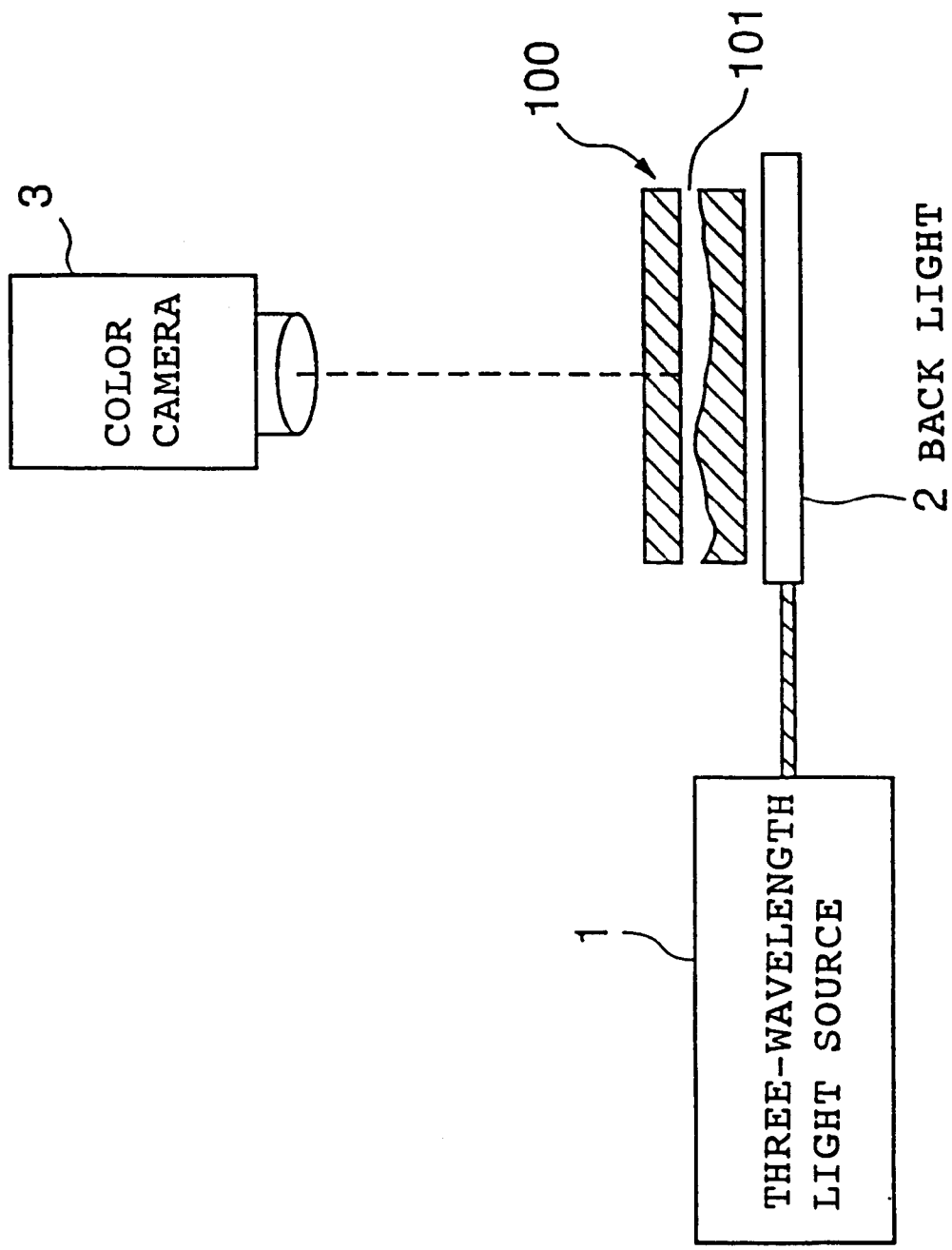
FIG. 1 is a configuration diagram showing first optical system for obtaining a color image with an interference fringe according to one embodiment of the present invention.
Figure 2:
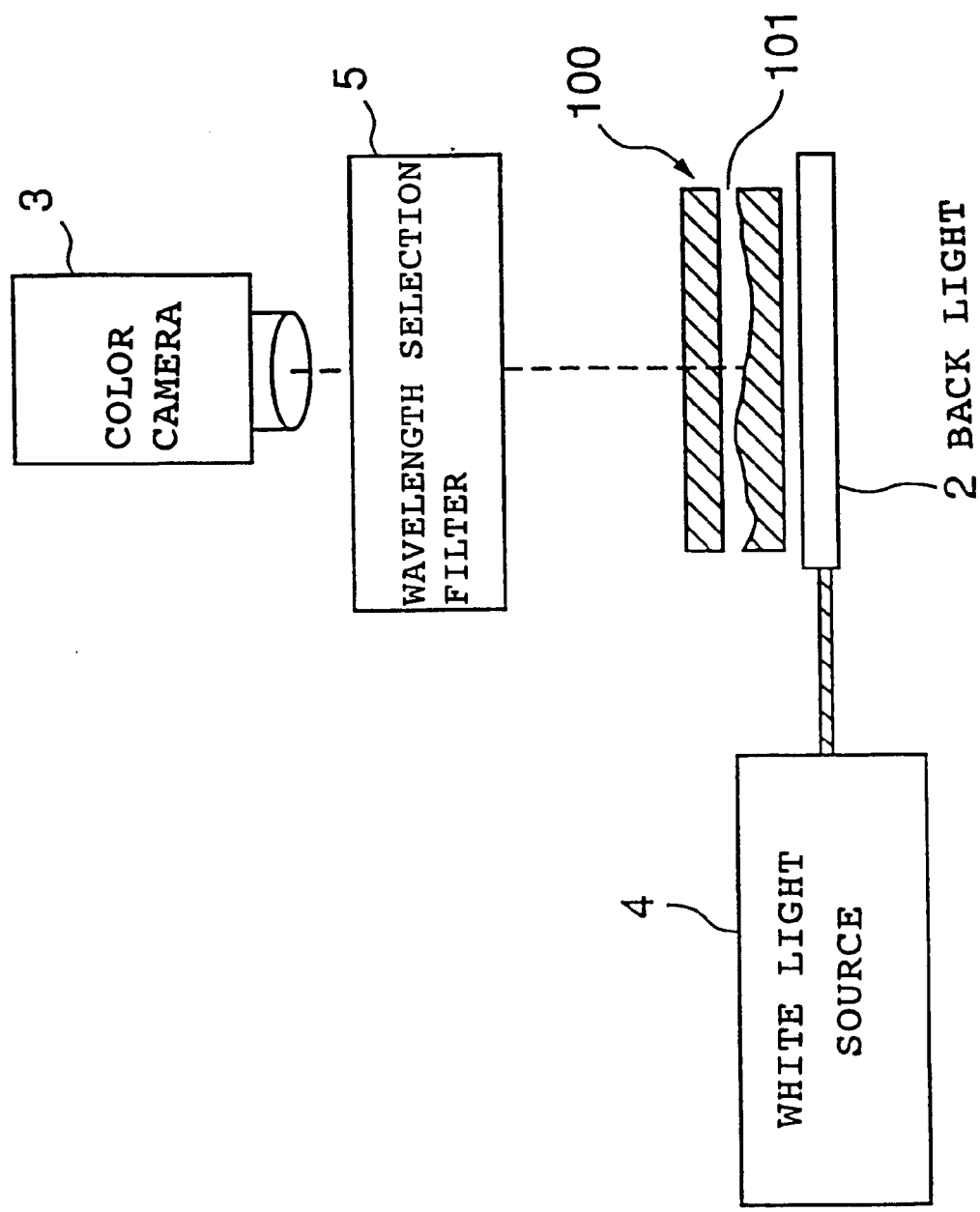
FIG. 2 is a configuration diagram, showing a second optical system for obtaining a color image with an interference fringe according to one embodiment of the present invention.

FIG. 2 is a configuration diagram showing a second optical system for obtaining a color image of an interference fringe according to one embodiment of the present invention. Here, light from a while light source is emitted to an object to be measured 100 via a back light 2, thereby transmitting the object to be measured 100, and the interference fringe caused by a gap that the object to be measured 100 has is shot by the color camera 3. At this time, the color camera 3 comprises a wavelength selection filter 5 for selectively transmitting color lights with a plurality of wavelengths (hereinafter, referred to as three types of color lights of blue, green, and red lights), thereby shooting the interference fringes of these colors by the color camera 3. The wavelength selection filter 5 may be provided in the color camera 3.

Third Embodiment

Figure 3:
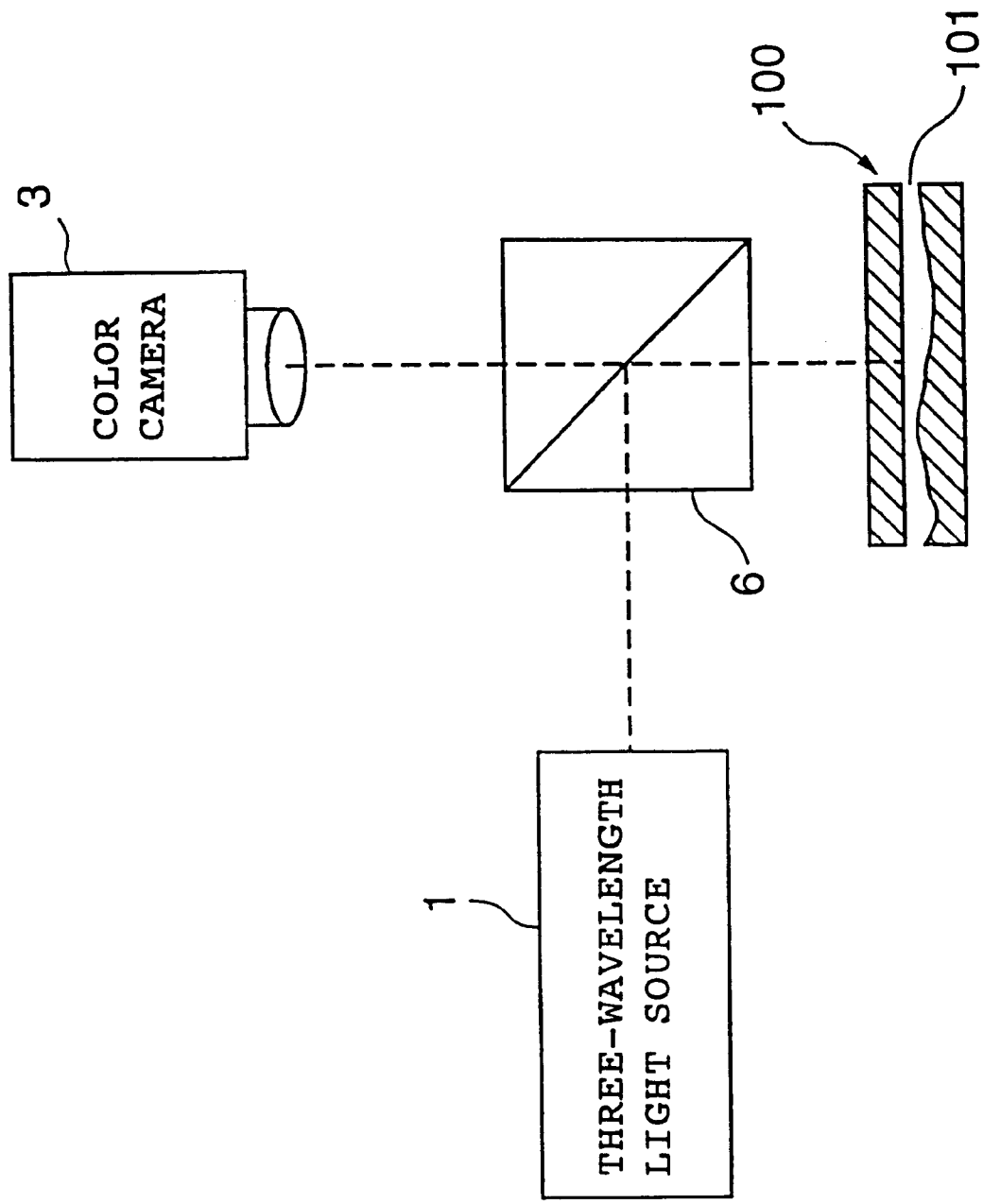
FIG. 3 is a configuration diagram showing a third optical system for obtaining a color image with an interference fringe according to one embodiment of the present invention.

FIG. 3 is a configuration diagram showing a third optical system for obtaining a color image of an interference fringe according to one embodiment of the present invention. Lights from a light source 1 that emits color lights with a plurality of different wavelengths (which are three kinds of color lights of blue light, green light and red light in the following examples) are emitted to a measurement object 100. Further, the reflected lights are transmitted to the beam splitter 6 the transmitted lights are shot by a color camera 3 to shoot an interference fringes occurring to the gap 101 which the measurement object has.

Fourth Embodiment

Figure 4:
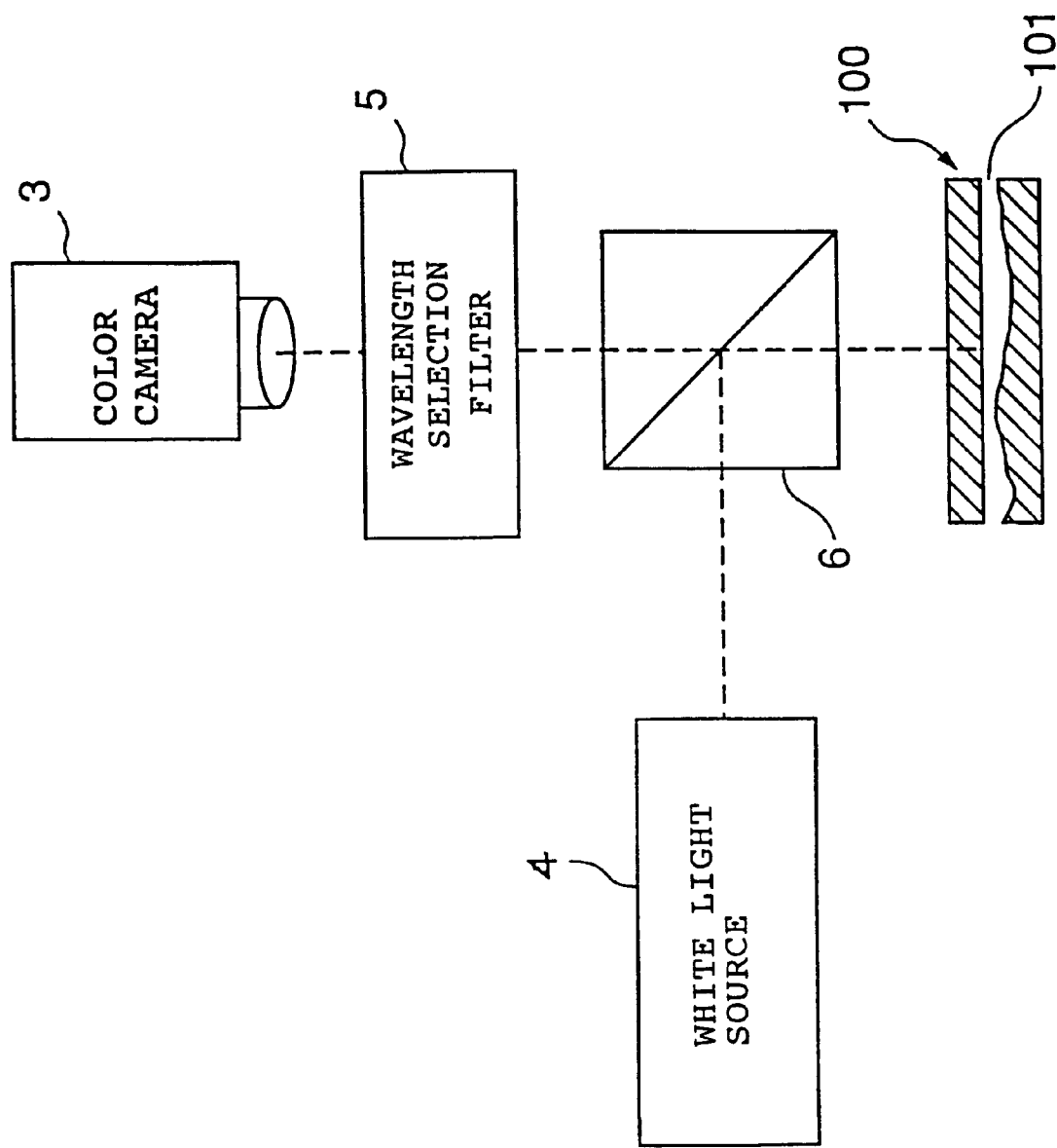
FIG. 4 is a configuration diagram showing a fourth optical system for obtaining a color image with an interference fringe according to one embodiment of the present invention.

FIG. 4 is a configuration diagram showing a fourth optical system for obtaining a color image of an interference fringe according to one embodiment of the present embodiment. Light from an white light source 4 is reflected toward the object to be measured 100 by a beam splitter 6, and the resultant light is reflected again by the object to be measured 100. Further, the reflected light is transmitted through the beam splitter 6, and the transmitted light is shot the color camera 3, thereby shooting an interference fringe caused by a gap 101 that the object to be measured 100 has. The color camera 3 comprises a wavelength selection filter 5 that selectively transmits color lights with a plurality of different wavelengths (hereinafter, referred to as three types of color lights such as blue, green, and red lights).

In the case of the above third and fourth embodiments, the light from the light source is transmitted toward the object to be measured 100 by the beam splitter 6, the resultant light is reflected again by the object to be measured 100, and further, the reflected light is reflected again by the beam splitter 6, whereby the reflected light may be shot by the color camera 3.

In addition, in the above first and third embodiments, if the color lights from the three wavelength light source 1 are emitted individually by time division, an interference fringe shooting at the color camera 3 must be conducted for respective color lights total three times (one for each color light). However, in the case where the color lights from the three-wavelength light source 1 are produced as a composite light, only one time of interference fringe shooting at the color camera 3 will suffice, thus enabling faster measurement.

Although an LED or laser can be used for the three-wavelength light source, if the color lights with wide wavelength bandwidths are emitted from the three-wavelength light source 1, an interference pattern is blurred. Thus, a wavelength in a narrower bandwidth is used as such emission light.

Also, in the above first to fourth embodiments, if the color camera 3 is provided as a CCD camera, image data composed of a number of pixels can be obtained, thus facilitating data processing.

Figure 5:
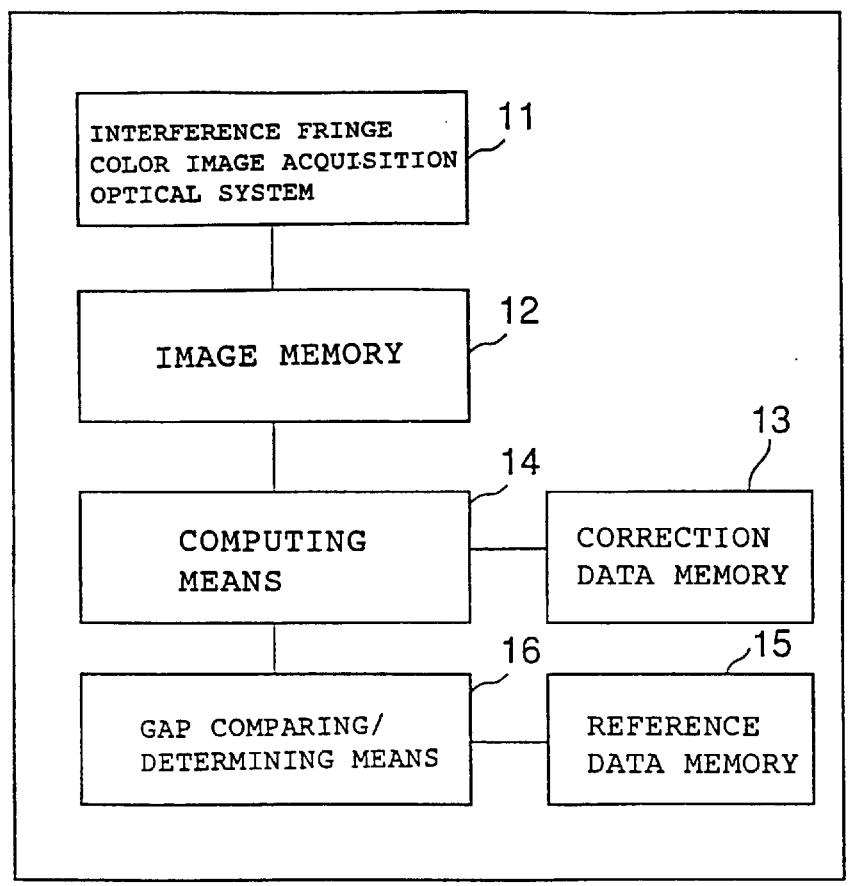
FIG. 5 is a block diagram depicting a configuration of a gap measuring apparatus according to one embodiment of the present invention.

(2) Configuration of a Gap Measuring Apparatus According to the Present Invention FIG. 5 is a block diagram depicting a configuration of a gap measuring apparatus according to one embodiment of the present embodiment.

Here, reference numeral 11 denotes an interference fringe color image acquisition optical system described in the first to fourth embodiments of (1) comprising a function for generating an interference fringe, followed by shooting the fringe in color; reference numeral 12 denotes an image memory that stores an interference fringe color image obtained by the interference fringe color image acquisition optical system 11; reference numeral 13 denotes a correction data memory that stores in advance correction data for correcting the intensities of blue light, green light and red light of an interference fringe image obtained by a color camera 3 in consideration of variable factors to the respective color lights; reference numeral 14 denotes computing means for correcting, using the correction data, each intensity of blue light, green light and red light at a fixed position among predetermined positions (which are arbitrarily set in each image, for example, at all pixels over the image or every pixel on a center line in the width direction of the image) on the image read out from the image memory 12, followed by computing an actual ratio among (or of) the intensities of the three color lights (three dimensional ratio, for example) based on the corrected color light intensities of the fixed position; reference numeral 15 denotes a reference data memory for storing reference data mentioned later; reference numeral 16 denotes gap comparing/determining means for comparing the actual ratio obtained by the computing means 14 with theoretical ratios stored in the reference data memory 15, followed by determining a gap value that corresponds to the closest theoretical ratio to the actual ratio, as the gap value at the fixed position on the object to be measured.

(3) Correction Data Stored in the Correction Data Memory 13

Figure 6:
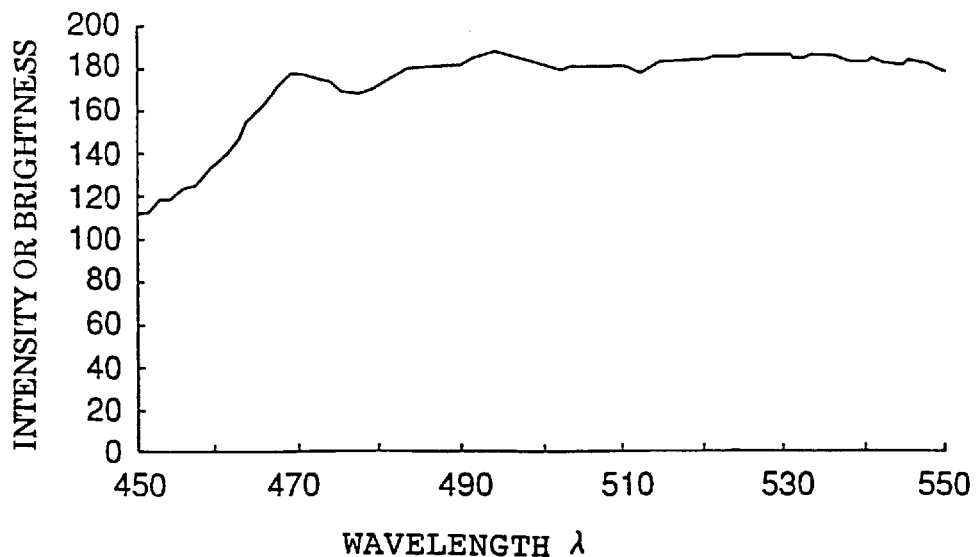
FIG. 6 is a graph showing correction data for eliminating an effect caused by variable factors relate to each waveform of image data shot by a color camera.

Light intensities of an image shot by the color camera 3 is primarily affected by variable factors such as (a) light emission spectrum characteristics of a light source; (b) spectrum characteristics of an illumination optical system; and (c) camera spectrum sensitivity characteristics, relating to light wavelengths, and influences caused by those factors should be eliminated. Because of this, a correction table is created in advance, and the influences caused by the above factors are corrected relating to each wavelength based on the table. This correction table shows a relationship between a wavelength and a light intensity as shown in FIG. 6 which is obtained by measuring average light intensity of an dense region of an interference fringe, for every wavelength or measuring light intensity of a image of a prepared sample having a gap with a coherent distance or more, for every wavelength.

(4) Reference Data Stored in the Reference Data Memory 15

Figure 7:
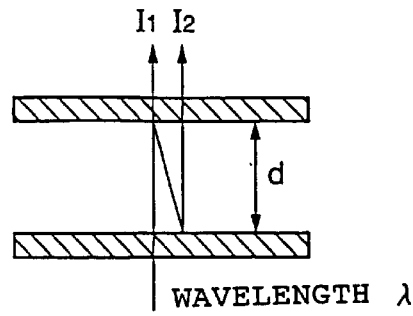
FIG. 7 is an illustrative diagram illustrating an interference of lights $I_1$ and $I_2$ that transmit a gap.

When light with wavelength $\lambda$ is transmitted through a pair of transparent parallel flat plates having a gap "d" between them, the transmitted lights I1 and I2 interfere with each other as shown in FIG. 7, and the intensity of the interference light is given as follows:

$$I=I_1+I_2+2(I_1 \cdot I_2)^{1/2} \cdot \cos(4\pi d/\lambda) \quad (2).$$

Incidentally, for example, assuming that $I_1+I_2=2$ $(I_1 \cdot I_2)^{1/2}=\frac{1}{2}$, and a plurality of values for the gap "d" within a range to be measured, for example, values between 3000 nm and 4000 nm are assigned, theoretical intensities $I_B$, $I_G$, and $I_R$ of the interference lights are determined for blue light, green light and red light having respective wavelengths. Then, a theoretical ratio among (or of) the intensities of the interference lights (a three dimensional ratio, for example) for a gap "d" is obtained.

Figure 8:
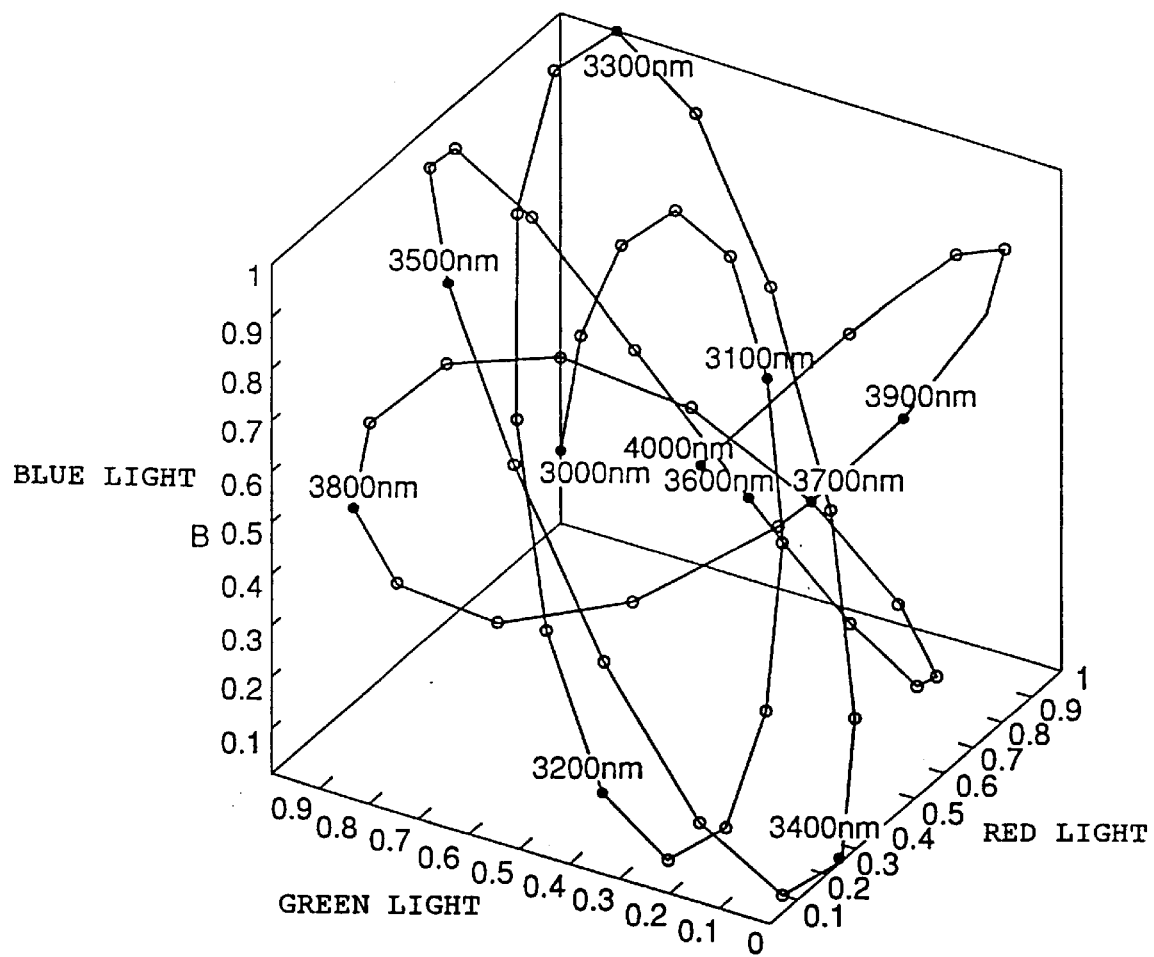
FIG. 8 is a relationship diagram showing relation between a theoretical ratio among (or of) intensities of blue light, green light and red light each of which causes interference of the light transmitted in a gap, and a gap value of the gap for each of predetermined gap values.

Such a theoretical ratio among the light intensities of color lights is expressed as a function of the gap "d" as, for example, shown in FIG. 8, and is stored as reference data in the memory.

Figure 9:
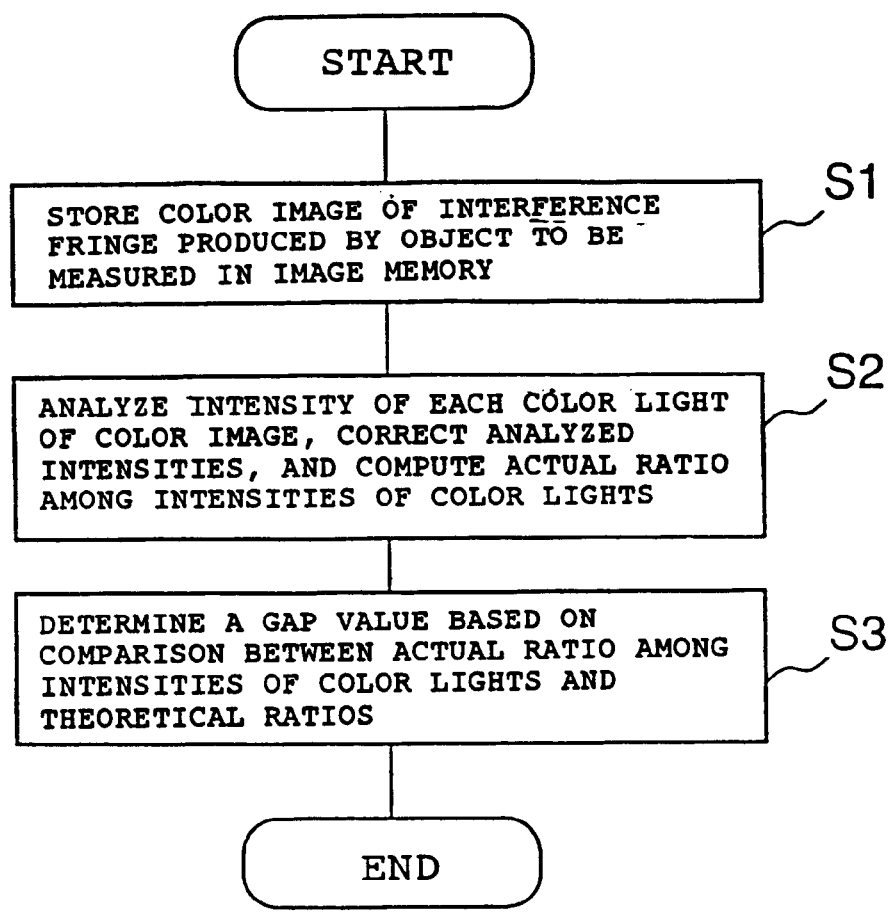
FIG. 9 is a flow chart showing measurement processing procedures performed by the gap measuring apparatus according to one embodiment of the present invention.

(5) Measurement by Data Memory Gap Measuring Apparatus According to the Present Invention FIG. 9 is a flow chart showing measuring procedures using a gap measuring apparatus having a color camera according to one embodiment of the present invention.

First, a color image of an interference fringe is stored in an image memory 12 by using an interference fringe color image acquisition optical system 11 (S1).

Figure 10:
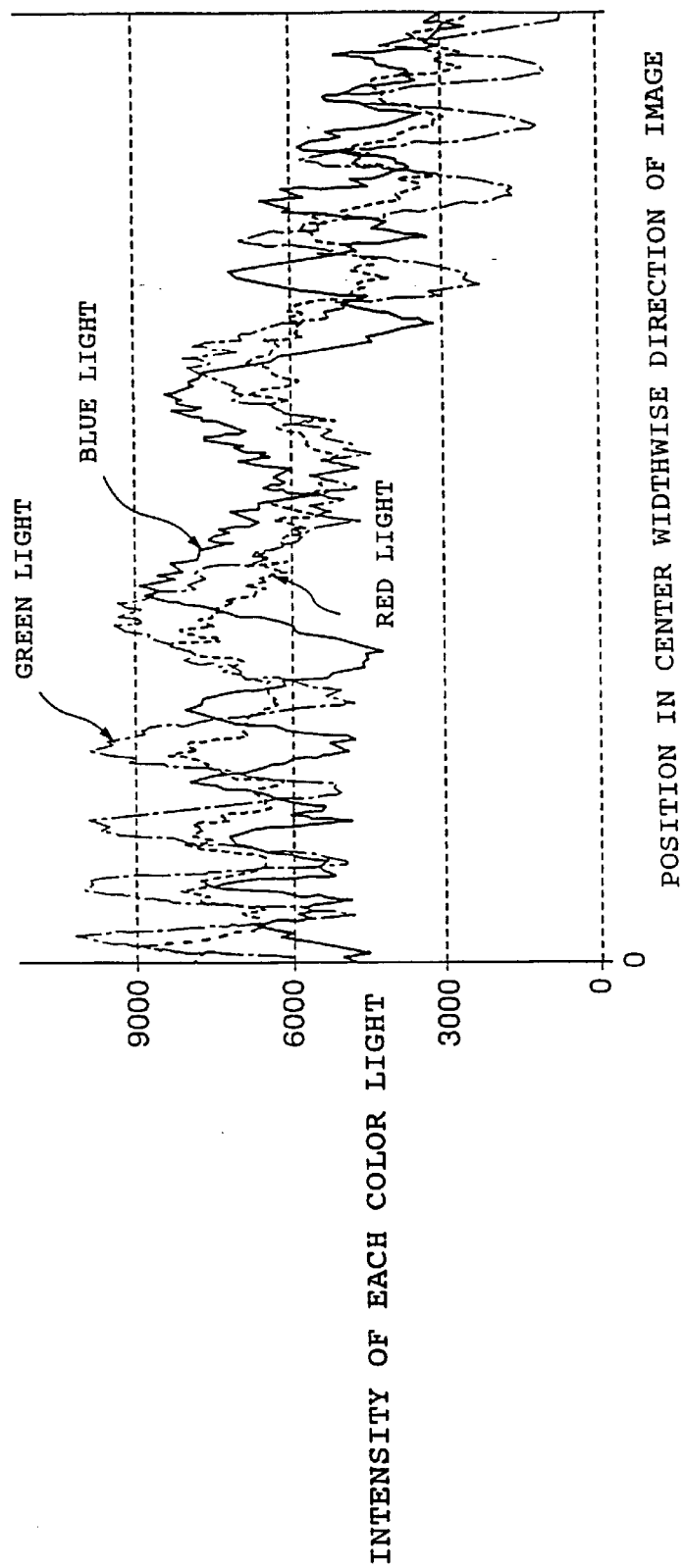
FIG. 10 is an illustrative graph showing intensities of each color light based on interference fringes.

Then, computing means 14 analyses the intensities of blue light, green light, and red light of each of the aforementioned predetermined positions in the image, for example, at pixels on a center line in the width direction of the image as shown in FIG. 10, normalizes the analyzed intensities of blue light, green light, red light by dividing or subtracting them by correction data stored in a correction data memory 13, whereby the intensities of color lights are corrected to eliminate an effect caused by the above variable factors, and then, computes the actual ratio among (or of) the corrected color light intensities is computed (S2).

Further, gap comparing/determining means 16 compares the actual ratio computed by the computing means 14 with theoretical ratios in the reference data memory 15 and determines the gap value that corresponds to the closest theoretical ratio to the actual ratio, as the gap value of a gap provided in the object to be measured at a position corresponding to the fixed position in the image (S3). Then, data processing at S2 and S3 is carried out for each pixel on the center line in widthwise direction of the object, whereby gap values of in the central portion of the object can be determined.

Incidentally, the steps S2 and S3 may be repeatedly performed for each of the predetermined positions to determined the gap values. Further, the actual ratios may be computed for all the predetermined positions at S2 previously to S3, then the actual ratios may be compared with theoretical ratios to determine the gap values for all the predetermined positions at S3.

The above data processing may be carried out at all pixel positions of the image, whereby a gap in the object to be measured can be determined in a three-dimensional manner.

Figure 11:
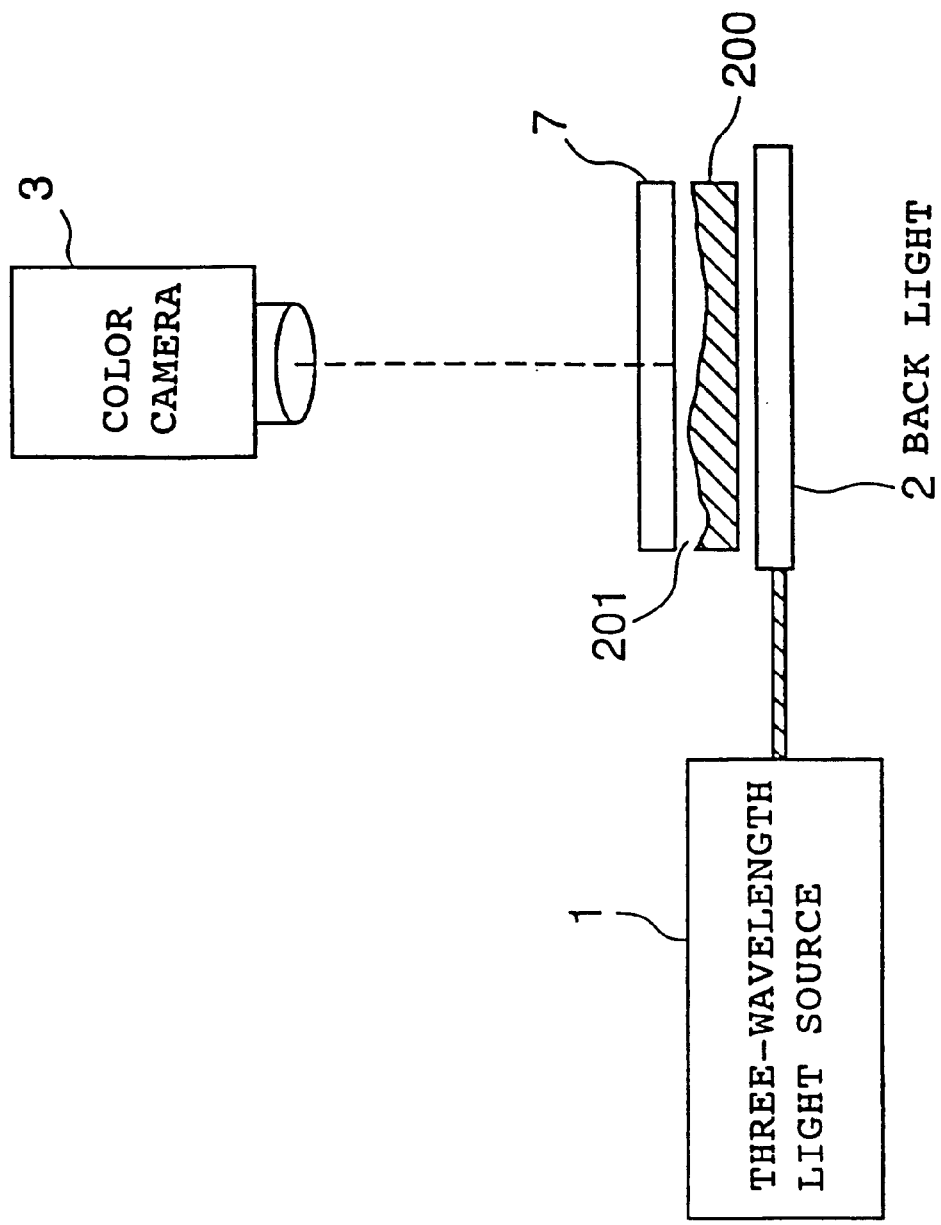
FIG. 11 is a configuration diagram showing a fifth optical system for obtaining a color image of an interference fringe according to one embodiment of the present invention.

(6) Configuration of Optical System for Obtaining Color Image Data on Interference Fringe Used for Shape Measurement First Embodiment FIG. 11 is configuration diagram showing a fifth optical system for obtaining a color image of an interference fringe according to one embodiment of the present invention. The lights from a three-wavelength light source 1 that emits color lights with a plurality of different wavelengths (hereinafter, referred to as three types of color lights such a blue light, green light, and red light) are forced to transmit an object to be measured 200 and a transparent plate shaped element 7 having a gap relate to a measurement face of the object to be measured 200 and having a flat surface disposed oppositely via a back light 2. Then, the interference fringe caused by a gap 201 formed by the object to be measured 200 and transparent plate shape element 7 is shot by a color camera 3.

Second Embodiment

Figure 12:
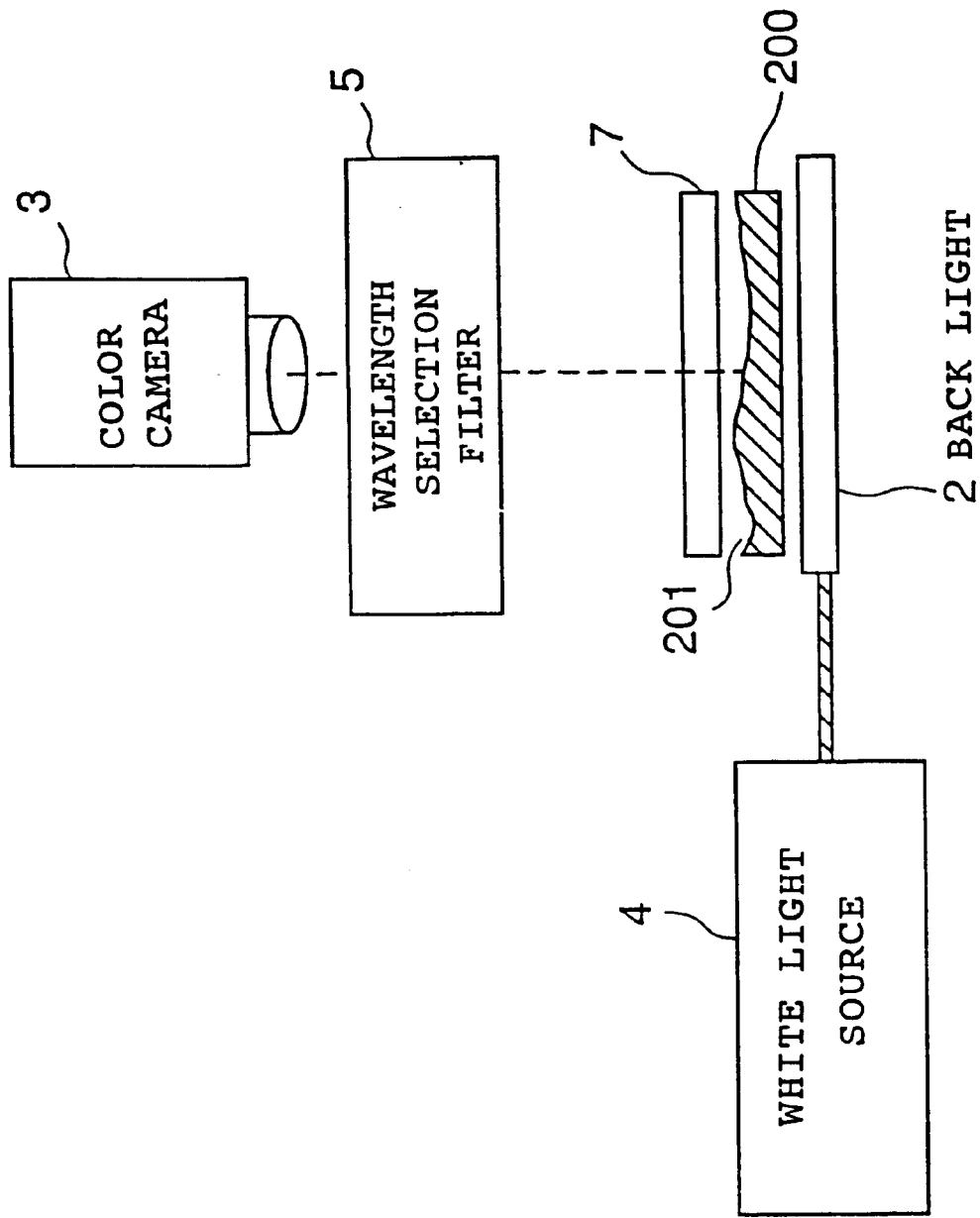
FIG. 12 is a configuration diagram showing a sixth optical system for obtaining a color image of an interference fringe according to one embodiment of the present invention.

FIG. 12 is configuration diagram showing a sixth optical system for obtaining a color image of an interference fringe according to one embodiment of the present invention. Here, the light from a white light source 4 is forced to transmit an object to be measured 200 and a transparent plate shaped element 7 having a gap relate to a measurement face of the object to be measured 200 and having a flat surface disposed oppositely via a back light 2. Then, the interference fringe caused by a gap formed by the object to be measured 200 and transparent plate shaped element 7 is shot by the color camera 3. At this time, the color camera 3 comprises a wavelength selection filter for selectively transmitting color lights with a plurality of different wavelengths (hereinafter, referred to three types of color lights such as blue, green, and red lights), wherein the interference fringes of these colors are shot by the color camera 3. The wavelength selection filter 5 may be provided in the color camera 3.

Third Embodiment

Figure 13:
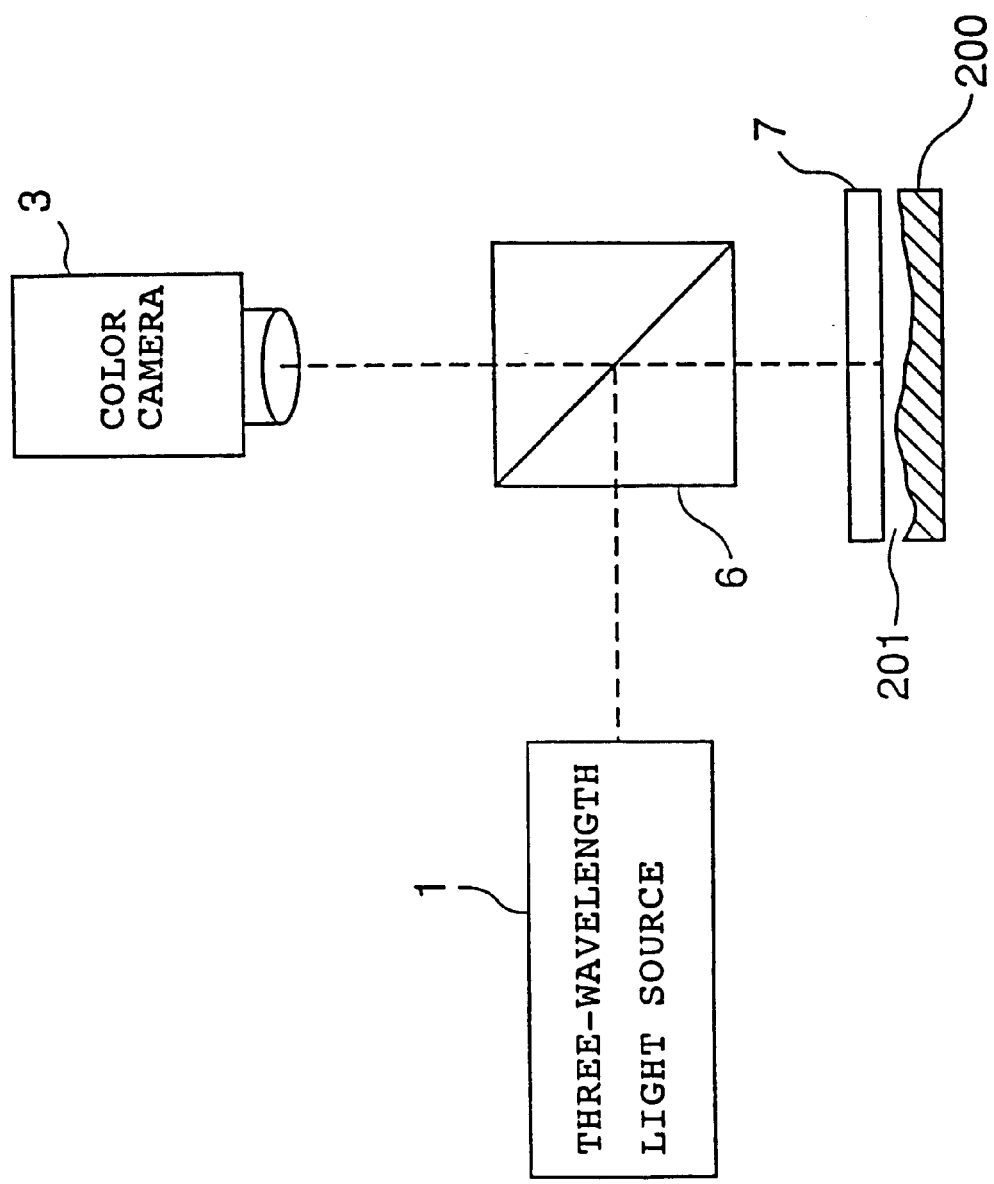
FIG. 13 is a configuration diagram showing a seventh optical system for obtaining a color image of an interference fringe according to one embodiment of the present invention.

FIG. 13 is configuration diagram showing a seventh optical system for obtaining a color image of an interference fringe according to one embodiment of the present invention. Lights from a three-wavelength light source 1 that emits color lights with a plurality of different wavelengths (hereinafter, referred to as three types of color lights such a blue light, green light, and red light) are reflected toward an object to be measured 200 and a transparent plate shaped element 7 having a gap relate to the object to be measured 200 and having a flat surface disposed oppositely. The resultant lights are reflected by the object to be measured 200 and transparent plate shaped element 7. Further, the reflected light is forced to transmit a beam splitter 6, and the transmitted light is shot by the color camera 3, thereby shooting an interference fringe caused by a gap 201 formed by the object to be measured 200 and transparent plate shaped element 7.

Fourth Embodiment

Figure 14:
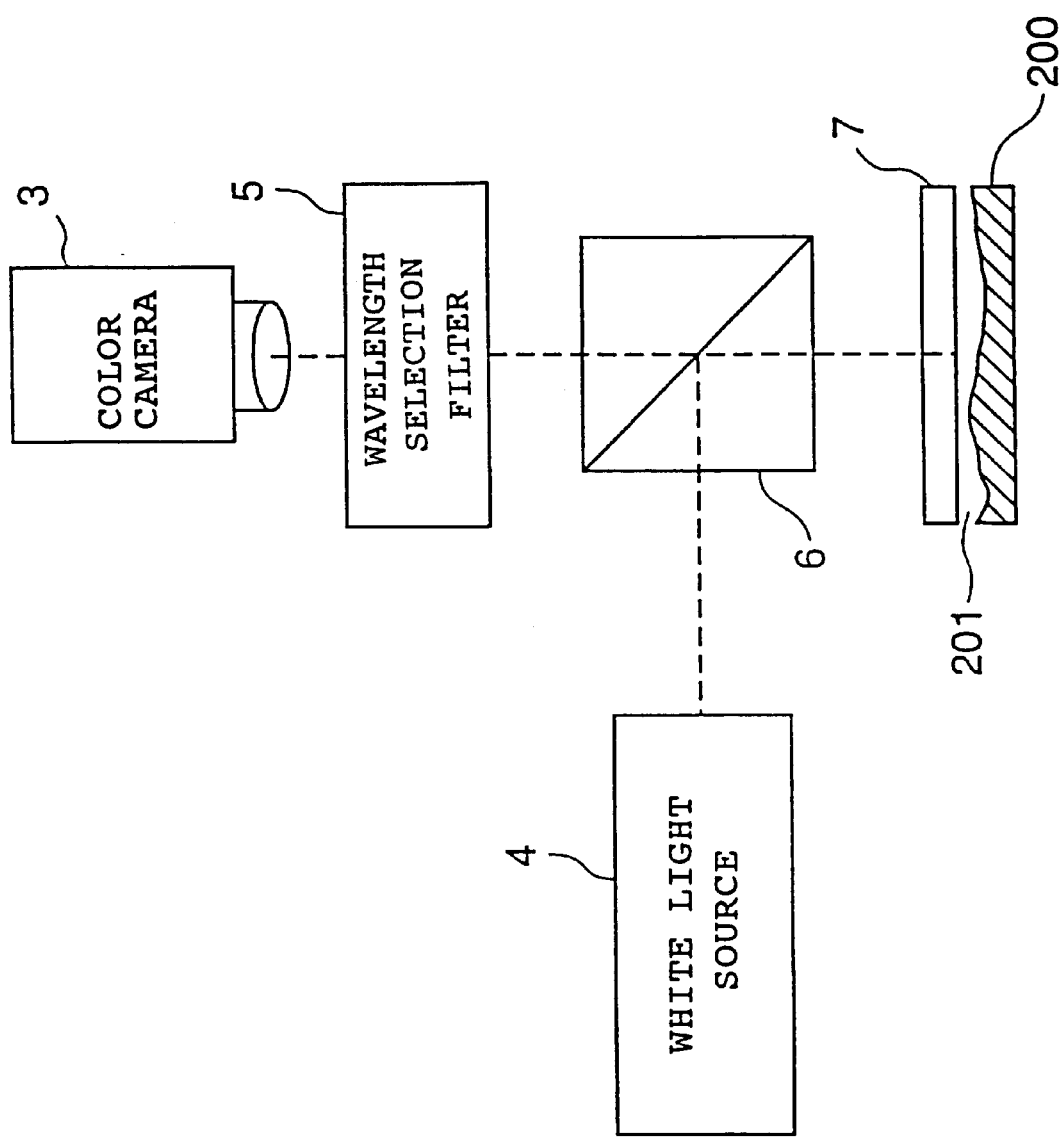
FIG. 14 is a configuration diagram showing of an eighth optical system for obtaining a color image of an interference fringe according to one embodiment of the present invention.

FIG. 14 is a configuration diagram showing an eighth optical system for obtaining a color image of an interference fringe according to one embodiment of the present invention. The light from a white light source 4 is reflected toward an object to be measured 200 and a transparent plate shaped element 7 having a gap relate to a measurement face of the object to be measured 200 and having a flat surface disposed oppositely. The resultant light is reflected by the object to be measured 200 and transparent plate shaped element 7. Further, the reflected light is forced to transmit a beam splitter 6, and the transmitted light is shot by a color camera 3, thereby shooting an interference fringe caused by a gap 201 formed by the object to be measured 200 and transparent plate shaped element 7. At this time, the color camera 3 comprises a wavelength selection filter 5 that selectively transmits color lights with a plurality of different wavelengths thereinafter, referred to as three types of color lights such as blue light, green light, and red light), wherein the interference fringes of these colors are shot by the color camera 3. The wavelength selection filter 5 may be provided in the color camera 3.

In the above third and fourth embodiments, the light from the light source is transmitted toward the object to be measured 200 and transparent plate shaped element 7 by the beam splitter 6, the resultant light is reflected by the object to be measured 200 and transparent plate shaped element 7, and further, the reflected light is reflected by the beam splitter 6 so that the reflected light may be shot by the color camera 3.

Fifth Embodiment

Figure 15:
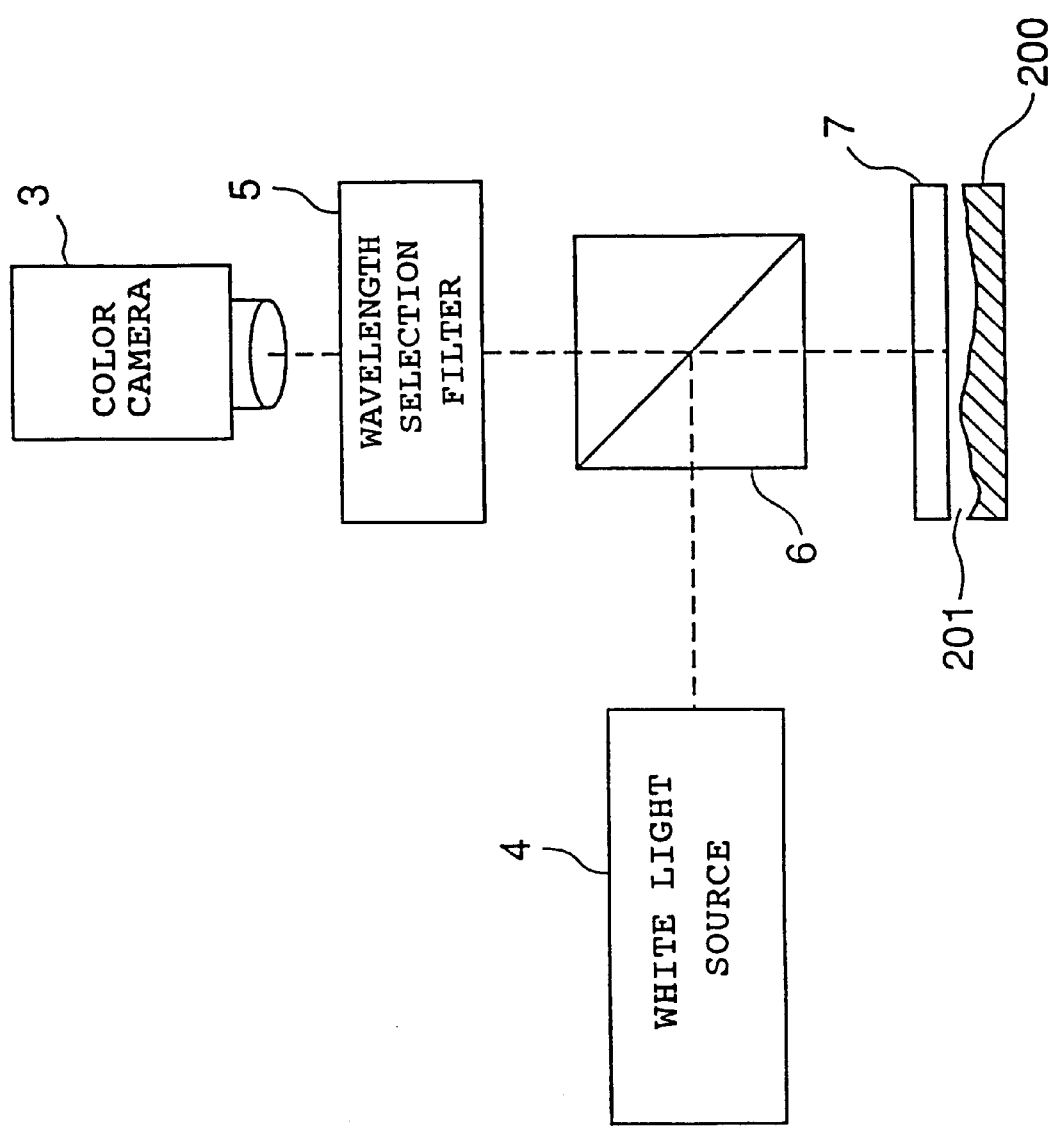
FIG. 15 is a configuration diagram showing a ninth optical system for obtaining a color image of an interference fringe according to one embodiment of the present invention.

FIG. 15 is configuration diagram showing a ninth embodiment for obtaining a color image of an interference fringe according to one embodiment of the present embodiment by using a principle of a so called Michaelson's interferometer. Lights from a three-dimensional wavelength light source 1 that emits color lights with a plurality of different wavelengths (hereinafter, referred to as three types of color lights such as blue light, green light, and red light) are reflected toward an object to be measured 200 via a beam splitter 8, the resultant lights are reflected by the object to be measured 200, and further, the reflected lights are forced to transmit the beam splitter 8. At the same time, the lights from the three-wavelength light source 1 are transmitted toward a reference mirror 9 by the beam splitter 8, and the lights are reflected by the object to be measured 200, and the reflected lights are reflected by the beam splitter 8. Such reflected light from the object to be measured 200 and reflected light from the reference mirror 9 cross each other via the beam splitter 8, whereby an interference fringe caused by an optical path difference in two refractive lights is shot by the color camera 3.

Sixth Embodiment

Figure 16:
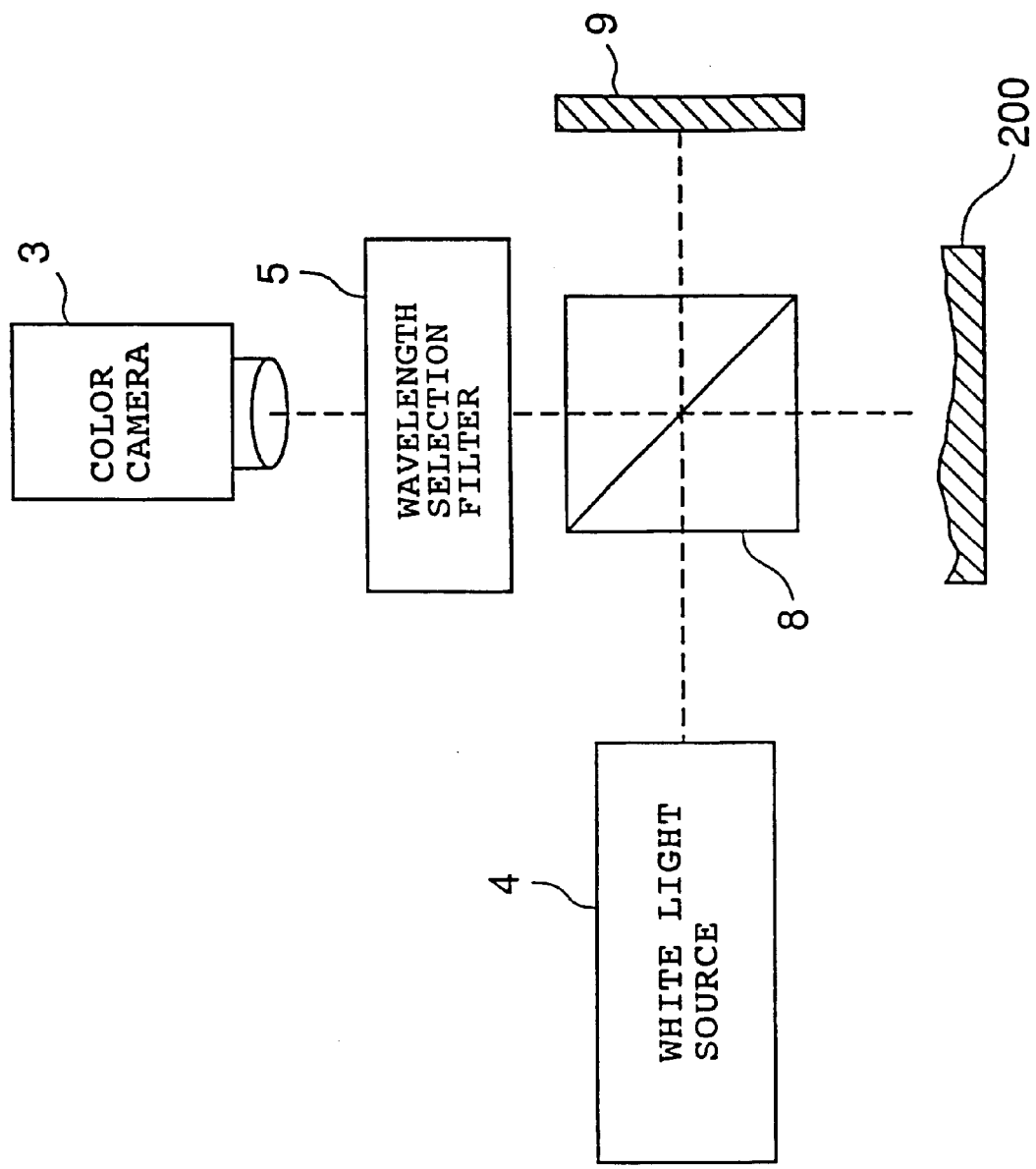
FIG. 16 is a configuration diagram showing a tenth optical system for obtaining a color image of an interference fringe according to one embodiment of the present invention.

FIG. 16 is configuration diagram showing a tenth optical system for obtaining a color image of an interference fringe according to one embodiment of the present invention. In the above described configuration according to the fifth embodiment, a white light source 4 and a wavelength selection filter 5 are used instead of using the three-wavelength light source 1.

In the case of the above described fifth and sixth embodiments, the positions of the object to be measured 200 and reference mirror 9 may be replaced with each other.

In addition, in the above described first, third, and fifth embodiments, if the color lights from the three-wavelength light source 1 are emitted individually by time division, an interference fringe shooting must be conducted for respective color lights total three times (one for each color light). However, in the case where the color lights from the three-wavelength light source 1 are produced as a composite light, only one time of interference fringe shooting at the color camera 3 will suffice, thus enabling faster measurement.

Although an LED or laser can be used for the three-wavelength light source, if the color lights with wide wavelength bandwidths are emitted from the three-wavelength light source 1, an interference pattern is blurred. Thus, a wavelength in a narrower bandwidth is used as such emission light.

Also, in the above first to fourth embodiments, if the color camera 3 is provided as a CCD camera, image data composed of a number of pixels can be obtained thus facilitating data processing.

Figure 17:
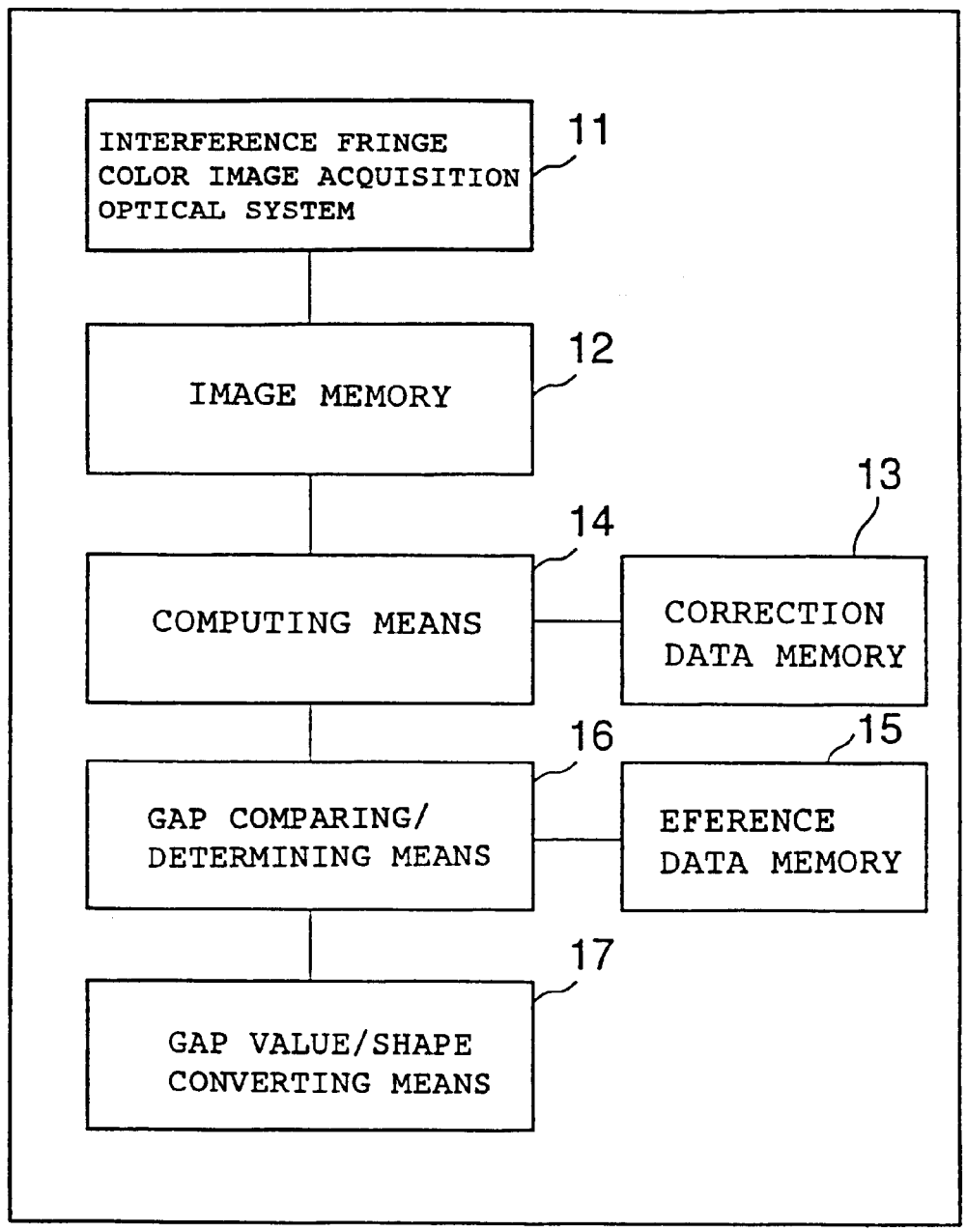
FIG. 17 is a block diagram depicting a configuration of a shape measuring apparatus according to one embodiment of the present invention.

(7) Configuration of, and Measuring Procedures for, Shape Measuring Apparatus According to the Present Invention First Embodiment FIG. 17 is a block diagram depicting a configuration of a shape measuring apparatus according to one embodiment of the present invention. Here, reference numeral 11 denotes an interference fringe color image acquisition optical system described in the first to fourth examples of (6), which comprises a function for generating an interference fringe and shooting it in color; reference numeral 12 denotes an image memory that stores interference fringe color image data obtained by the interference fringe color image acquisition optical system 11; reference numeral 13 denotes a correction data memory that stores in advance the intensities of blue light, green light, and red light of the interference fringe image obtained by shooting a fringe by the color camera 3; reference numeral 14 denotes computing means for analyzing the intensities of blue light, green light, and red light of a fixed position among predetermined positions (which are arbitrarily set in each image, for example, at all pixels over the image or every pixel on a center line in the width direction of the image) in image data, correcting a change caused by variable factors by using the correction data, and computing the actually measured ratio of the intensities of the respective color lights based on the corrected data; reference numeral 15 denotes a reference data memory that computes the intensity of the interference fringe that corresponds to each of the wavelengths of blue light, green light, and red light based on a plurality of preset gap values, and stores a theoretical ratio of them to be associated with the set gap value; and reference numeral 16 denotes gap comparing/determining means for comparing the gap value caused by the computing means 14 with the theoretical ratio caused by a reference data memory 15, and determining a gap value that corresponds to the closest theoretical value to the actually measured ratio as a gap having an object to be measured; reference numeral 17 denotes gap value/shape converting means for determining the shape of an object to be measured based on the gap measurement value obtained by the gap comparing/determining means 16.

In shape measurement using the above described shape measuring apparatus, the gap measurement value obtained in the same procedures as steps S1 to S3 of the gap measuring procedures described in (5) is converted at a position in the height direction of the object to be measured by the gap value/shape converting means 17. Therefore, this process is carried out within a predetermined range, whereby the surface shape of the object to be measured in that range is determined. This determination is made by utilizing the fact that a transparent plate shaped element 7 configuring a gap 201 is flat, and thus, the gap measurement value corresponds to a change in gap forming face of the object to be measured 200.

Second Embodiment

Figure 18:
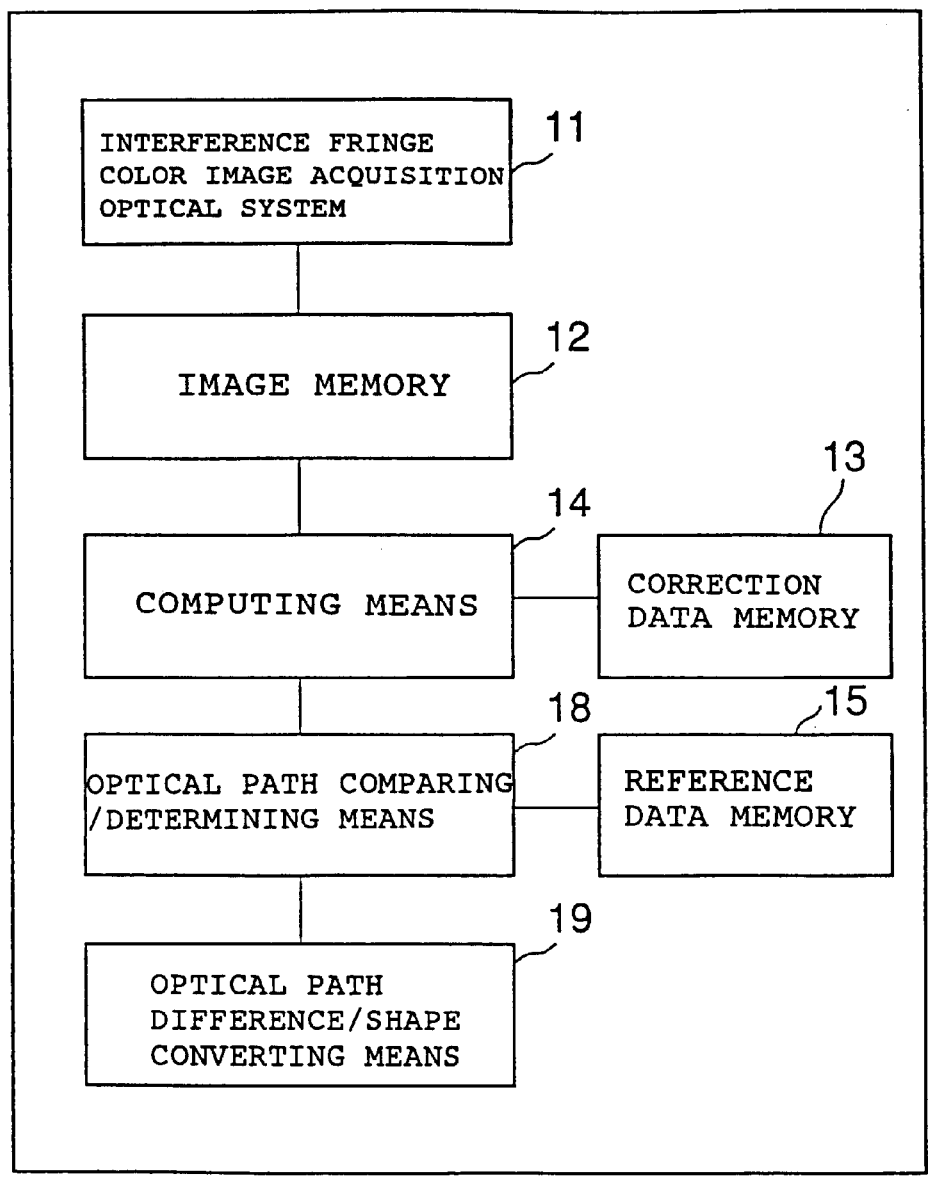
FIG. 18 is a block diagram depicting a configuration of another shape measuring apparatus according to the embodiment of the present invention.
Figure 19:
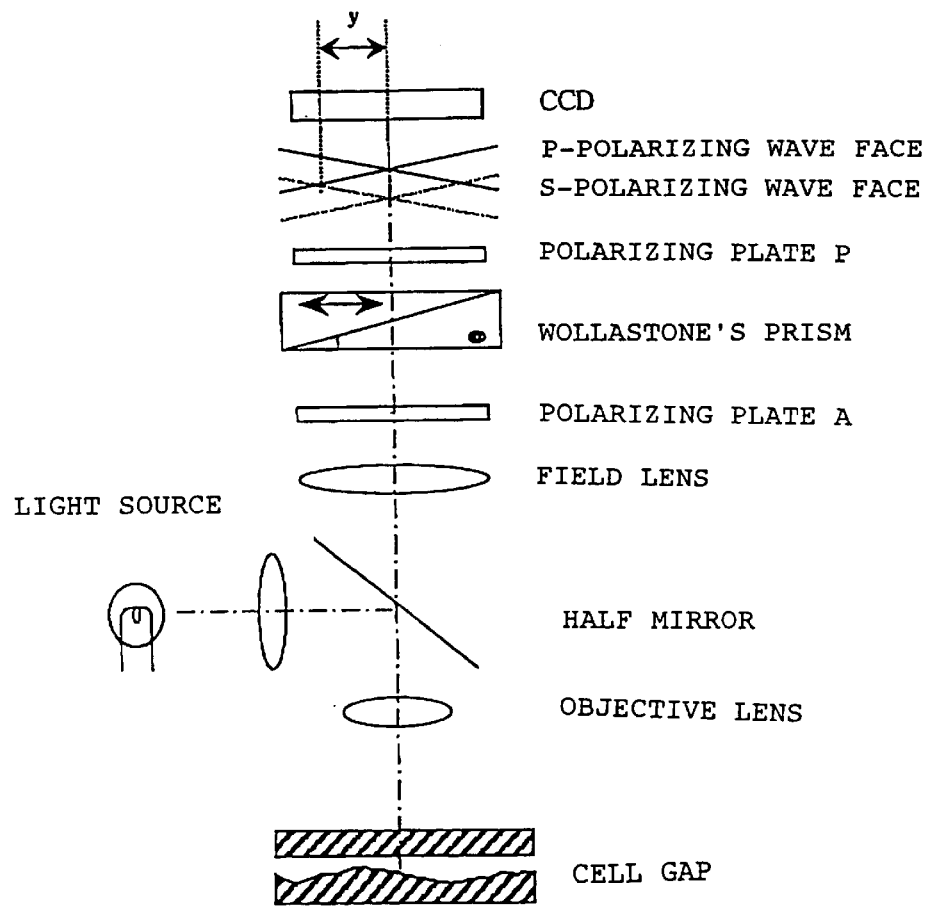
FIG. 19 is a configuration diagram showing a conventional gap measuring apparatus.

FIG. 18 is a block diagram depicting a configuration of another shape measuring apparatus according to one embodiment of the present invention. Here, reference numeral 11 denotes an interference fringe color image acquisition optical system described in the fifth or sixth embodiment of (6), which comprises a function for generating an interference fringe and shooting it in color; reference numeral 12 denotes an image memory that stores interference fringe color image data obtained by the interference fringe color image acquisition optical system 11; reference numeral 13 denotes a correction data memory that stores in advance the intensities of blue light, green light, and red light of the interference fringe image obtained by shooting a fringe by the color camera 3; reference numeral 14 denotes computing means for analyzing the intensities of blue light, green light, and red light of a fixed position among predetermined positions (which are arbitrarily set in each image, for example, at all pixels over the image or every pixel on a center line in the width direction of the image) in image data, correcting a change caused by a change element by using the correction data, and computing the actually measured ratio of the intensities of the respective color lights based on the corrected data; reference numeral 20 denotes a reference data memory in conformity with FIG. 8 that computes the interference fringe intensities that corresponds to wavelength of blue light, green light, and red light each based on a plurality of optical path differences (gap "d"×2) that has been preset, and stores the theoretical ratio of them to be associated with the set optical path difference; reference numeral 18 denotes optical path comparing/determining means for determining an optical path difference that corresponds to the closest theoretical ratio to the actually measured ratio as an optical path difference optical between a beam splitter 8 and an object to be measured 200 and an optical path difference between the beam splitter 8 and a reference mirror 9 by comparing the actually measured ratio obtained by the computing means 14 and the theoretical ratio with each other; and reference numeral 19 denotes optical path difference/shape converting means for determining the shape of a measuring object based on the optical path difference obtained by the optical path comparing/determining means 18.

Shape measurement using this Michaelson's interferometer utilizes an optical path difference between the beam splitter 8 and the object to be measured 200 and an optical path difference between the beam splitter 8 and the reference mirror 9 (this optical path difference corresponds to twice of the above gap value). Therefore, in shape measurement using this Michaelson's interferometer as well, an optical path difference is measured by the optical path difference comparing/determining means 18 in conformance with the shape measuring procedures described in the first embodiment, and the surface shape of the object to be measured 200 is determined from such an optical path difference by the optical path difference/shape converting means 19.

In the above described embodiments, although image data, correction data, and reference data are stored in separation memories (devices), these data may be stored in one memory.

In addition, the computing means 14, gap comparing/determining means 16, and gap value/shape converting means 17 can execute their respective functions by using one CPU, for example. Further, the computing means 14, optical path difference comparing/determining means 18, and optical path difference/shape converting means 19 can executes their respective functions by using one CPU similarly.

Further, the computing means 14, optical path difference comparing/determining means 18, and optical path difference/shape converting means 19 can executes their respective functions by using one CPU similarly.

Figure 20:
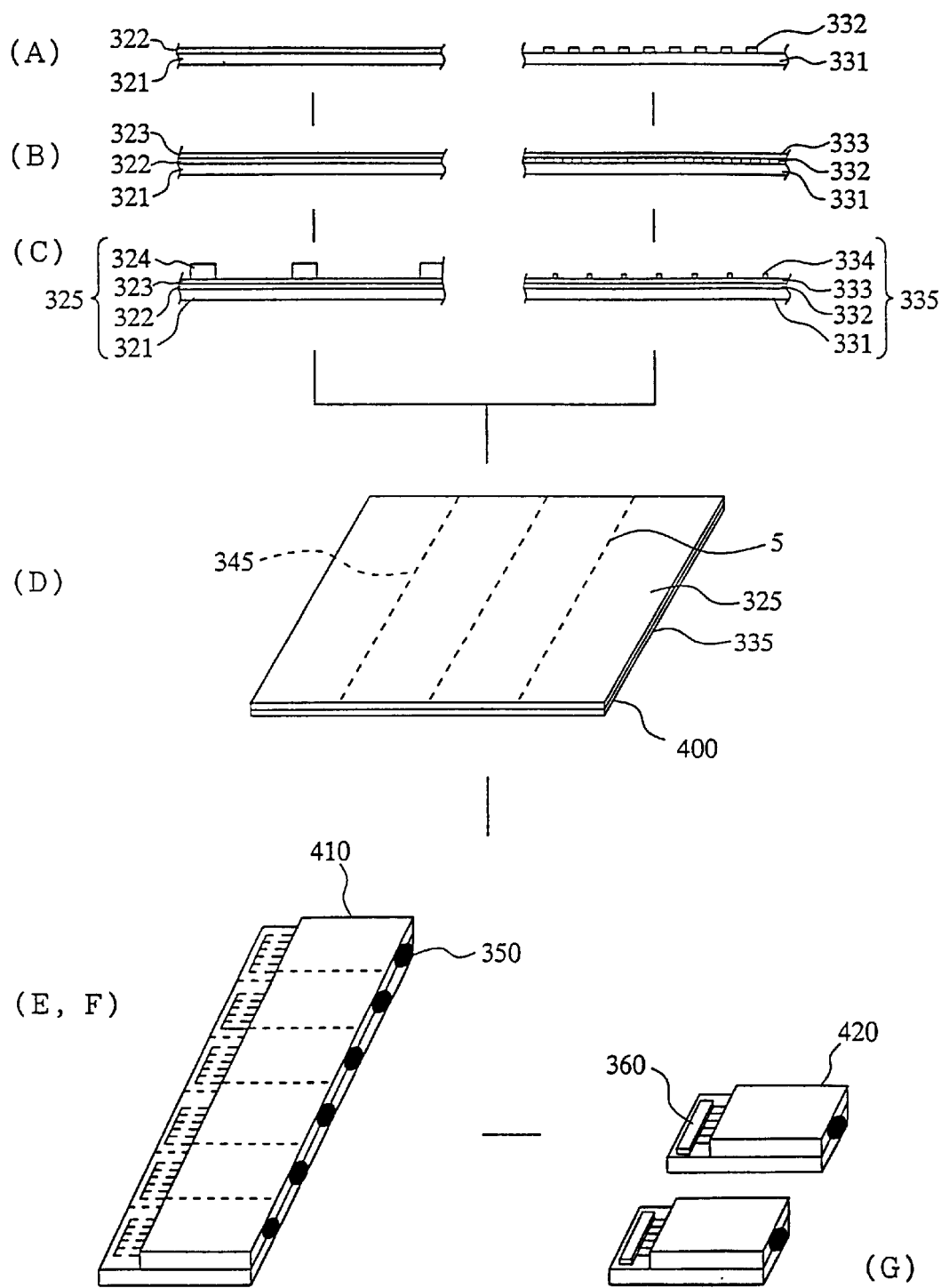
FIG. 20 is a flow diagram for manufacturing a liquid crystal device according to one embodiment of the present invention.

Finally, one embodiment of manufacturing process of a liquid crystal device utilizing the gap measuring method or apparatus of the present invention will be explained with reference to FIG. 20.

(A) Necessary circuits are formed on an upper substrate 321 and a lower substrate 331 using a photolithography. For example, a common electrode 322 is formed on the upper substrate 321, and thin film transistors 332 are formed on the lower substrate 331. Incidentally, element(s) to be formed in this step are changed according to the kind of a liquid crystal device.

(B) Next, an orientation film 323 is formed on the upper substrate 321 with the common electrode 322 and rubbing is performed thereon. Also, an orientation film 333 is formed on the lower substrate 331 with the thin film transistors 332 and rubbing is performed thereon like the above.

(C) Next, seal material for sealing liquid crystal is applied on one of the substrates, for example, the upper substrate 321. Then, a gap material 334 is sprayed on the other substrate, for example, the orientation film 333 of the lower substrate 331. Incidentally, applying seal material and spraying gap material are not limited to the above aspect. Such an aspect can be employed that seal material is applied to one substrate and spraying gap material is performed.

(D) Two substrates 325 and 335 manufactured in the steps (A) to (C) are pasted to each other to manufacture a panel 400. Then, a gap in the panel 400 is measured by the above gap measuring apparatus or method so that an examination is made about whether or not the gap measured is in a predetermined range.

(E) Next, as a first break step, the panel 400 which has been confirmed to be in the predetermined range is subjected to a cutting process to produce a rectangular panel 410.

(F) Liquid crystal is injected into the gap via a liquid crystal injecting portion of the rectangular panel 410 and the liquid crystal is sealed by a liquid crystal sealing material 350.

(G) Furthermore, as a second break, the rectangular panel 410 is subjected to a cutting process to form a panel 420 corresponding to a size of one panel (product). Then, a driver IC 360 and the like are mounted on the panel 420 to complete a liquid crystal device.

According to the methods and apparatus of the invention, a measurement of each of a gap with width or shape of the object can be performed at a high speed with high accuracy without moving the object or apparatus.

Further, in manufacturing a liquid crystal device, a gap in which liquid crystal is injected is checked at once, so that the manufacturing efficiency of a liquid crystal device is improved.

What is claimed is:

1. A gap measuring method characterized by comprising the steps of:

applying a plurality of color lights to a member provided with a gap, to produce color interference fringes;

obtaining respective intensities of the color lights in the images of the interference fringes taken by a color camera, at each of predetermined positions of each image, so as to compute an actual ratio among the obtained intensities of the color lights for each of the predetermined positions; and obtaining gap values of a plurality of points of the gap provided in the member, based on said actual ratio and theoretical ratios each of which is computed based on intensities of said color lights in an image, correspondingly to each of preliminarily set gap values.

2. A gap measuring method as claimed in claim 1, characterized in that the interference fringe is obtained by using transmitted light through the member.

3. A gap measuring method as claimed in claim 1, characterized in that the interference fringe is obtained by using reflected light from the member.

4. A gap measuring method as claimed in claim 1, characterized in that a composite light including said plurality of color lights is applied to the member.

5. A gap measuring method as claimed in claim 1, characterized in that white light including said plurality of color lights is applied to the member, and that a filter is provided for transmitting the plurality of color light to the color camera.

6. A gap measuring method as claimed in claim 1, characterized in that the intensities of the each color light in the images taken up by the color camera are corrected in consideration of a variable element for the each color light.

7. A gap measuring method a claimed in claim 1, characterized in that each of the images is composed of a plurality of pixels, and gap measurement is carried out for each pixel.

8. A shape measuring method utilizing the gap measuring method as claimed in claim 1, characterized in that one of members defining a gap is made into a plate-shaped element with a flat surface to effect the measurement, and the shape of the other member defining the gap is determined on the basis of the thus obtained gap measurement value.

9. A gap measuring apparatus characterized by comprising:
- a light source for applying a plurality of different color lights to an object to be measured having light transmission properties;
- a color camera for picking up images of interference fringes formed by the light transmitted through the object to be measured;
- an image memory for storing images picked up by the color camera;
- computing means for obtaining respective intensities of the color lights in the images at each of predetermined positions of each image, so as to compute an actual ratio among the obtained intensities of the color lights for each of the predetermined positions;
- a reference data memory for storing theoretical ratios among intensities of said color lights in an image, correspondingly to each of preliminarily set gap values; and
- gap value comparing/determining means for determining gap values of a plurality of points of a gap provided in the object to be measured according to the actual ratio and the theoretical ratios.

10. A gap measuring apparatus characterized by comprising:
- a light source for applying light to an object to be measured having light transmission properties;
- a color camera for picking up images of interference fringes formed by the light transmitted through the object to be measured;
- a filter for transmitting a plurality of different color lights to the color camera;
- an image memory for storing images picked up by the color camera;
- computing means for obtaining respective intensities of the color lights in the images at each of predetermined positions of each image to compute an actual ratio among the obtained intensities of the color lights for each of the predetermined positions;
- a reference data memory for storing theoretical ratios among intensities of said color lights in an image correspondingly toe ach of preliminarily set gap values; and
- gap value comparing/determining means for determining gap values of a plurality of points of a gap provided in the object to be measured according to the actual ratio and the theoretical ratios.

11. A gap measuring apparatus characterized by comprising:
- a light source for emitting a plurality of different color lights;
- a color camera for picking up images of light interference fringes;
- optical means for directing the lights from the light source toward an object to be measured and directing reflected lights thereof from the object to be measured toward the color camera;
- an image memory for storing images of the interference fringe formed by the lights from the optical means and picked up by the color camera;
- computing means for obtaining respective intensities of the color lights in the images at each of predetermined positions of each image, so as to compute an actual ratio among the obtained intensities of the color lights for each of the predetermined positions;
- a reference data memory for storing theoretical ratios among intensities of said color lights in an image, correspondingly to each of preliminarily set gap values; and
- gap value comparing/determining means for determining gap values of a plurality of points of a gap provided in the object to be measured according to the actual ratio and the theoretical ratios.

12. A gap measuring apparatus characterized by comprising:
- a light source for emitting light;
- a color camera for picking up images of light interference fringes;
- a filter for transmitting a plurality of different color lights to the color camera;
- optical means for directing the light from the light source toward an object to be measured and directing reflected light thereof from the object to be measured toward the color camera;
- an image memory for storing images of the interference fringe formed by the light from the optical means and picked up by the color camera;
- computing means for obtaining respective intensities of the color lights in the image at each of predetermined positions of each image, so as to compute an actual ratio among the obtained intensities of the color lights for each of the predetermined positions;
- a reference data memory for storing theoretical ratios among intensities of said color lights in an image correspondingly to each of preliminarily set gap values; and
- gap value comparing/determining means for determining gap values of a plurality of points of gap provided in the object to be measured according to the actual ratio and the theoretical ratios.

13. A gap measuring apparatus as claimed in claim 9, characterized by further comprising correction means for correcting the intensities of the each color light of the images picked up by the color camera in consideration of a variable element for the each color light.

14. A shape measuring apparatus characterized by comprising:
- a light source for applying a plurality of different color lights to a measurement object having light transmission properties;
- a light transmission plate shaped element with a flat surface disposed apart by a gap from the object to be measured;
- a color camera for picking up images of interference fringes formed by the lights transmitted through the object to be measured and the light transmission plate shaped element;
- an image memory for storing images picked up by the color camera;
- computing means for obtaining respective intensities of the color lights in the images at each of predetermined positions of each image, so as to compute an actual ratio among the obtained intensities of the color lights for each of the predetermined positions;
- a reference data memory for storing theoretical ratios among intensities of said color lights in an image correspondingly to each of preliminarily set gap values;
- gap value comparing/determining means for determining gap values of a plurality of a gap provided in the object to be measured according to the actual ratio and the theoretical ratios; and gap value/shape converting means for determining a shape of the object to be measured on the basis of the gap values obtained by the gap value comparing/determining means.

15. A shape apparatus characterized by comprising:

a light source for applying light to an object to be measured having light transmission properties;

a light transmission plate-shaped element with a flat surface disposed apart by a gap from the object to be measured;

a color camera for picking up images of interference fringes formed by the lights transmitted through the measurement object and the light transmission plate-shaped element;

a filter for transmitting a plurality of different color lights to the color camera;

an image memory for storing images picked up by the color camera;

computing means for obtaining respective intensities of the color lights in the images at each of predetermined positions of each images so as to compute an actual ratio among the obtained intensities of the each color lights for each of the predetermined positions;

a reference data memory for storing theoretical ratios among intensities of said color lights in an image correspondingly to each of preliminarily set gap values, gap value comparing/determining means for determining gap values of a plurality of points of a gap provided in the object to be measured according to the actual ratio and the theoretical ratios; and gap value/shape converting means for determining a shape of the object to be measured on the basis of the gap values obtained by the gap value comparing/determining means.

16. A shape measuring apparatus characterized by comprising:

a light source for emitting a plurality of different color lights;

a light transmission plate shaped element with a flat surface disposed apart by a gap from an object to be measured;

a color camera for picking up images of light interference fringes;

optical means for directing the light from the light source toward the object to be measured and the light transmission plate shaped element and directing reflected lights thereof from the object to be measured and the light transmission plate shaped element toward the color camera;

an image memory for storing images of the interference fringe formed by the lights from the optical means and picked up by the color camera;

computing means for obtaining respective intensities of the color lights in the images at each of predetermined positions of each image, so as to compute an actual ratio among the obtained intensities of the each color lights for each of the predetermined positions;

a reference data memory for storing theoretical ratios among the intensities of said color lights in an image correspondingly to each of preliminarily set gap values;

gap value comparing/determining means for determining gap values of a plurality of points of a gap provided in the object to be measured according to the actual ratio and the theoretical ratios; and gap value/shape converting means for determining a shape of the object to be measured on the basis of the gap values obtained by the gap value comparing/determining means.

17. A shape measuring apparatus characterized by comprising:

a light source for emitting light;

a light transmission plate-shaped element with a flat surface disposed apart by a gap from an object to be measured;

a color camera for picking up images interference fringes of light;

a filter for transmitting a plurality of different color lights to the color camera;

optical means for directing the light from the light source toward the object to be measured and the light transmission plate-shaped element and directing reflected lights thereof from the object to be measured and the light transmission plate-shaped element toward the color camera;

an image memory for storing images of the interference fringes formed by the lights from the optical means and picked up by the color camera;

computing means for obtaining respective intensities of the color lights in the images at each of predetermined positions of each image, so as to compute an actual ratio among the obtained intensities of the color light;

a reference data memory for storing theoretical ratios among the intensities of said color lights in an image correspondingly to each of preliminarily set gap values;

gap value comparing/determining means for determining gap values of a plurality of points of a gap provided in the object to be measured according to the actual ratio the theoretical ratios; and gap value/shape converting means for determining a shape of the object to be measured on the basis of the gap values obtained by the gap value comparing/determining means.

18. A shape measuring apparatus characterized by comprising:

a light source for emitting a composite light of a plurality of different color lights;

a color camera for picking up images of light interference fringes;

a reference reflective member for reflecting light;

optical means for directing the light from the light source as an object light toward an object to be measured so as to direct reflected light thereof from the object to be measured toward the color camera, and for directing the light from the light source as a reference light toward the reference reflective member so as to direct reflected light thereof from the reference reflective member toward the color camera;

an image memory for storing images of the interference fringes formed by the lights from the optical means and picked up by the color camera;

computing means for obtaining respective intensities of the color lights of the images at each of predetermined positions of each image, so as to compute an actual ratio among the obtained intensities of the color light;

a reference data memory for storing theoretical ratios among the intensities of said color lights in an image correspondingly to each of preset optical path differences;

optical path difference comparing/determining means for determining differences at a plurality of points between an optical path between the optical means and the object to be measured and an optical path between the optical means and the reference reflective member according to the actual ratio and the theoretical ratios; and an optical path difference/shape converting means for determining a shape of the object to be measured on the basis of the optical path differences obtained by the optical path difference comparing/determining means.

19. A shape measuring apparatus characterized by comprising:

a light source for emitting light;

a color camera for picking up images of light interference fringes;

a filter for transmitting a plurality of different color lights to the color camera;

a reference reflective member for reflecting light;

optical means for directing the light from the light source as an object light toward an object to be measured so as to direct and directing the light from the light source reference light so as to direct reflected light thereof from the reference reflective member toward the color camera;

an image memory for storing images of the interference fringe formed by the lights from the optical means and picked up by the color camera;

computing means for obtaining respective intensities of the color lights of the images at each of predetermined positions of each image, so as to compute an actual ratio among the obtained intensity of the color lights;

a reference data memory for storing theoretical ratios among the intensities of said color lights in an image correspondingly to each of preset optical path differences;

optical path difference comparing/determining means for determining differences at a plurality of points between an optical path between the optical means and the object to be measured and an optical path between the optical means and the reference reflective member according to the actually measured ratio and the theoretical ratio; and an optical path difference/shape converting means for determining a shape of the object to be measured on the basis of the optical path differences obtained by the optical path difference comparing/determining means.

20. A shape measuring apparatus as claimed in claim 14, characterized by further comprising correction means for correcting the intensities of the color lights of the images picked up by the color camera in consideration of a variable element for the each color light.

21. A method for manufacturing a liquid crystal device in which liquid crystal is injected and sealed in a gap between two substrates, wherein, utilizing the gap measuring apparatus according to claim 9, a gap value of the gap is measured, so that liquid crystal is injected into the gap when the gap value is in a predetermined range.

22. A gap measuring apparatus as claimed in claim 10, characterized by further comprising correction means for correcting the intensities of the each color light of the images picked up by the color camera in consideration of a variable for the each color light.

23. A gap measuring apparatus as claimed in claim 11, characterized by further comprising correction means for correcting the intensities of the each color light of the images picked up by the color camera in consideration of a variable element for the each color light.

24. A gap measuring apparatus as claimed in claim 12, characterized by further comprising correction means for correcting the intensities of the each color light of the images picked up by the color camera in consideration of a variable element for the each color light.

25. A shape measuring apparatus as claimed in claim 15, characterized by further comprising correction means for correcting the intensities of the color light of the images picked up by the color camera in consideration of a variable element for the each color light.

26. A shape measuring apparatus as claimed in claim 16, characterized by further comprising correction means for correcting the intensities of the color lights of the images picked up by the color camera in consideration of a variable element for the each color light.

27. A shape measuring apparatus as claimed in claim 17, characterized by further comprising correction means for correcting the intensities of the color lights of the images picked up by the color camera in consideration of a variable element for the each color light.

28. A shape measuring apparatus as claimed in claim 18, characterized by further comprising correction means for correcting the intensities of the color lights of the images picked up by the color camera in consideration of a variable element for the each color light.

29. A shape measuring apparatus as claimed in claim 19, characterized by further comprising correction means for correcting the intensities of the color lights of the images picked up by the color camera in consideration of a variable element for the each color light.

30. A method for manufacturing a liquid crystal device in which liquid crystal is injected and sealed in a gap between two substrates, wherein, utilizing the gap measuring apparatus according to claim 10, a gap value of the apparatus is measured, so that liquid crystal is injected into the gap when the gap value is in a predetermined range.

31. A method for manufacturing a liquid crystal device in which liquid crystal is injected and sealed in a gap between two substrates, wherein, utilizing the gap measuring apparatus according to claim 11, a gap value of the gap is measured, so that liquid crystal is injected into the gap when the gap value is in a predetermined range.

32. A method for manufacturing a liquid crystal device in which liquid crystal is injected and sealed in a gap between two substrates, wherein, utilizing the gap measuring apparatus according to claim 12, a gap value of the gap is measured, so that liquid crystal is injected into the gap when the gap value is in a predetermined range.

* * * * *

UNITED STATES PATENT AND TRADEMARK OFFICE
CERTIFICATE OF CORRECTION

PATENT NO. : 6,657,218 B2
DATED : December 2, 2003
INVENTOR(S) : Noda

It is certified that error appears in the above-identified patent and that said Letters Patent is hereby corrected as shown below:

Title page,
Item [57], ABSTRACT,
Line 8, "and" should be -- an --

Column 1,
Line 18, "entirely" should be -- entirety --

Column 4,
Line 20, after "gap" insert -- from --

Column5,
Line 53, after "images" insert -- of --

Column 7,
Line 62, "related" should be -- related --

Column 8,
Line 20, delete "of"
Line 54, delete "as"
Line 63, "while light source" should be -- white light source 4 --

Column 9,
Line 18, "fringes" should be -- fringe --
Line 23, "an" should be -- a --

Column 10,
Line 43, "an" should be -- a --
Line 45, "a" should be -- an --
Line 50, "I1" and "I2" should be -- $I_1$ -- and -- $I_2$ --

Column 11,
Lines 32-33, "determined" should be -- determine --
Line 45, after "is" insert -- a --
Line 50, "a" should be -- as --
Line 57, "shape" should be -- shaped --
Line 60, after "is" insert -- a --

UNITED STATES PATENT AND TRADEMARK OFFICE
CERTIFICATE OF CORRECTION

PATENT NO. : 6,657,218 B2
DATED : December 2, 2003
INVENTOR(S) : Noda

It is certified that error appears in the above-identified patent and that said Letters Patent is hereby corrected as shown below:

Column 12,
Line 6, after "to" insert -- as --
Line 11, after "is" insert -- a --
Line 16, "a" should be -- as --
Line 45, "thereinafter" should be -- (hereinafter --
Line 59, after "is" insert -- a --

Column 13,
Line 14, after "is" insert -- a --

Column 15,
Lines 21-22, "separation" should be -- separate --
Lines 30 and 34, "executes" should be -- execute --

Column 17,
Line 44, "toe ach" should be -- to each --

Column 18,
Line 67, after "of" insert -- points of --

Signed and Sealed this

Tenth Day of August, 2004

JON W. DUDAS
*Acting Director of the United States Patent and Trademark Office*